(12) United States Patent
Tajiri

(10) Patent No.: US 8,936,454 B2
(45) Date of Patent: Jan. 20, 2015

(54) RESIN EXTRUSION DIE AND EXTRUSION METHOD USING THE SAME

(75) Inventor: Toshiyuki Tajiri, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 38 days.

(21) Appl. No.: 13/302,099

(22) Filed: Nov. 22, 2011

(65) Prior Publication Data

US 2012/0126466 A1    May 24, 2012

Related U.S. Application Data

(63) Continuation of application No. PCT/JP2010/003356, filed on May 19, 2010.

(30) Foreign Application Priority Data

Jun. 4, 2009   (JP) ................................ 2009-135328

(51) Int. Cl.
*D01D 5/14*  (2006.01)
*D01D 5/16*  (2006.01)
(Continued)

(52) U.S. Cl.
CPC . *B29C 47/12* (2013.01); *B29B 9/06* (2013.01); *B29C 47/0014* (2013.01); *B29C 47/0057* (2013.01); *B29C 47/0085* (2013.01); *B29C 47/085* (2013.01); *B29C 47/0883* (2013.01); *B29C 47/30* (2013.01); *B29C 47/34* (2013.01); *B29C 47/92* (2013.01); *B29C 47/0009* (2013.01); *B29C 47/14* (2013.01); *B29C 2947/926* (2013.01)
USPC ..................... 425/72.2; 264/555; 264/211.14; 425/382.2; 425/456; 425/464

(58) Field of Classification Search
USPC .......... 425/7, 72.2, 382.2, 464, 456; 264/555, 264/211.14
See application file for complete search history.

(56) References Cited

U.S. PATENT DOCUMENTS

| 2,765,153 | A  | * | 10/1956 | Gielow et al. .................... 366/79 |
| 6,010,592 | A  | * | 1/2000 | Jameson et al. ............ 156/379.6 |
| 7,018,188 | B2 | * | 3/2006 | James et al. ................. 425/72.2 |

FOREIGN PATENT DOCUMENTS

| JP | 57-089212 | 6/1982 |
| JP | 04-135823 | 5/1992 |
| JP | 09-225994 | 9/1997 |
| JP | 09-295334 | 11/1997 |
| JP | 10-264227 | 10/1998 |
| JP | 11-179781 | 7/1999 |

(Continued)

OTHER PUBLICATIONS

International Search Report issued Jun. 15, 2010 in PCT/JP2010/003356 filed May 19, 2010.

*Primary Examiner* — Yogendra Gupta
*Assistant Examiner* — Joseph Leyson
(74) *Attorney, Agent, or Firm* — Oblon, Spivak, McClelland, Maier & Neustadt, L.L.P.

(57) ABSTRACT

This invention provides a resin extrusion die capable of suppressing die drool generation and contamination of a resin molded form with generated die drool serving as foreign substances. The resin extrusion die includes a cap through which a molten resin is extruded, and a cover that includes a gas outlet for forming a gap around the tip of a discharge nozzle and covers at least part of the cap so as to form a space between the cap and the gas outlet. The gas outlet forms, around the tip of the discharge nozzle, the gap whose maximum width/minimum width ranges from 1.05 to 2.0, thereby changing a gas supplied into the cover and flowing out of the gap to a turbulent flow.

17 Claims, 10 Drawing Sheets

(51) Int. Cl.
  *B29C 47/12* (2006.01)
  *B29B 9/06* (2006.01)
  *B29C 47/00* (2006.01)
  *B29C 47/08* (2006.01)
  *B29C 47/30* (2006.01)
  *B29C 47/34* (2006.01)
  *B29C 47/92* (2006.01)
  *B29C 47/14* (2006.01)

(56) References Cited

FOREIGN PATENT DOCUMENTS

| | | |
|---|---|---|
| JP | 2003-305761 | 10/2003 |
| JP | 3681172 | 8/2005 |
| JP | 2007-320056 | 12/2007 |

\* cited by examiner

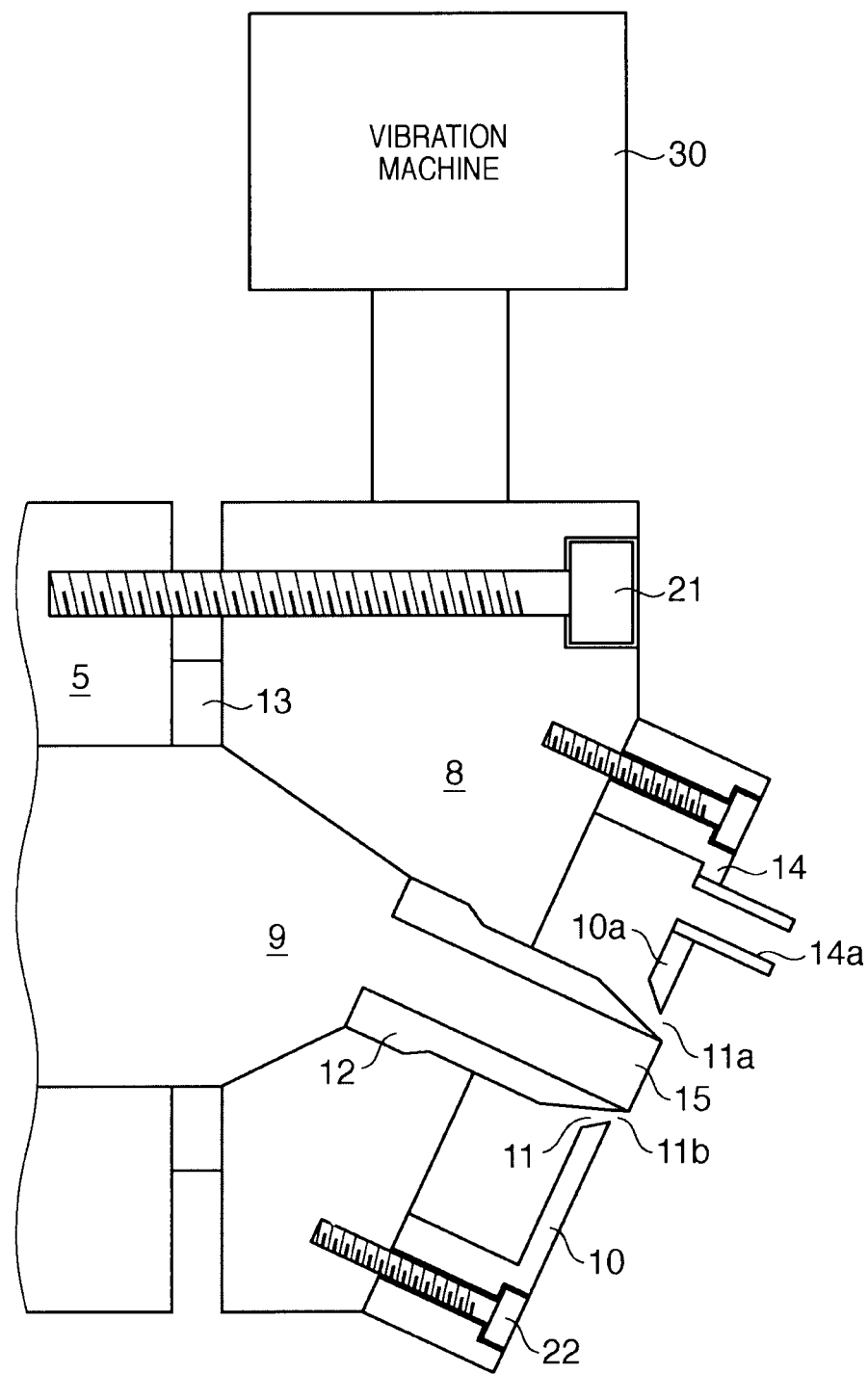

RESIN EXTRUSION DIE AND EXTRUSION METHOD USING THE SAME

TECHNICAL FIELD

The present invention relates to a resin extrusion die and an extrusion method using the same and, more particularly, to a resin extrusion die configured to extrude a molten resin into a strand and an extrusion method using the same.

BACKGROUND ART

Conventionally, a die configured to extrude a molten resin into a strand is widely used to, for example, granulate the resin. A die of this type generally has a plurality of nozzle-like orifices. A molten resin supplied from an extrusion machine is extruded from the orifices into strands. When manufacturing (granulating) resin pellets, the resin extruded into a strand is cut to a predetermined length by a cutter blade.

When the nozzle-like orifice continuously extrudes a resin, a very small quantity of resin adheres to the edge of the orifice. The resin in the small quantity that adheres to the orifice edge is metaphorically called "die drool". The die drool accumulates and increases in amount with the lapse of time. The die drool also deteriorates and discolors due to heat or progress of oxidation.

The uncontrolled die drool accumulates and increases in amount and peels off the orifice edges at a certain point of time. The die drool is then carried together with the extruded resin strands and mixed into granulated resin pellets as foreign substances. The die drool (foreign substances) has an outer appearance (color and shape) and physical properties different from those of a normally granulated resin. For this reason, if large die drool is mixed in the resin pellets, the outer appearance and physical properties of a molded form formed from the pellets are impaired.

There has been a proposal to suppress die drool generation and contamination of a product (pellets) with generated die drool (foreign substances). For example, PTL 1 discloses an extrusion machine which suppresses generation of die drool (foreign substances) as an independent solid or contamination by them by blowing a gas to the outer periphery (strand surface) of the tip of each orifice to blow the die drool off or by making the resin adhered to the orifice edges, which is still small in amount and has not yet so largely changed the properties, adhere to the surface of the molten resin (strands) so as to disperse and dilute it.

CITATION LIST

Patent Literature

PTL1: The publication of Japanese Patent No. 3681172 (FIGS. 2 to 6)

SUMMARY OF INVENTION

Problem to be Solved by the Invention

According to the technique described in PTL1, it is possible to suppress generation of die drool and contamination by it to some extent. However, the effect is insufficient. To completely eliminate the die drool, the gas to be blown to the outer periphery of the tip of each orifice needs to have a high flow velocity. However, since the gas is also blown to the strand surface, the extruded strand becomes unstable. The strands may break or adjacent strands may fuse into each other. That is, it is difficult to stably extrude the resin.

The present invention has been made in consideration of the above-described problem of the conventional technique, and provides a resin extrusion die configured to extrude a molten resin into a strand, which can suppress (prevent) relatively large die drool from contaminating a resin molded form as a foreign substance by blowing generated die drool off when it is still a small piece yet to accumulate around a nozzle and increase in amount so as to prevent it from being adhered to the surface of a strand or by dispersing and diluting die drool adhered to the surface of a strand, and an extrusion method using the die.

Means for Solving the Problem

Having examined many times the manner die drool occurs and the method of blowing it off by an air stream, the present inventor has found that die drool deposition can effectively be removed (prevented) by changing the jet stream to a turbulent flow using a specific method (structure), and come up with the present invention. As is generally known, when the air stream around an object changes from a laminar flow to a turbulent flow, the air resistance received by the object increases. In this case as well, when the jet stream changes to a turbulent flow, the air resistance received by die drool increases, and the die drool is readily blown off.

In addition, the direction of the air stream that has changed to the turbulent flow changes over time. This is supposed to enhance the effect of peeling off the die drool from the orifice edges.

The above-described object is achieved by a resin extrusion die configured to extrude a molten resin supplied from an extrusion machine into a strand, characterized by comprising a cap including a discharge nozzle through which the molten resin is extruded, a cover that includes a gas outlet for forming a gap around a tip of the discharge nozzle and covers at least part of the cap so as to form a space between the cap and the gas outlet, and a gas supply port configured to supply a gas to the space, wherein the gas outlet forms, around the tip of the discharge nozzle, a nonuniform gap whose maximum width dmax/minimum width dmin ranges from 1.05 to 2.0, thereby changing the gas flowing out of the gap to a turbulent flow.

Advantageous Effects of Invention

With the above-described arrangement, according to the present invention, it is possible to implement a resin extrusion die capable of suppressing die drool deposition and also suppressing contamination of an extruded resin molded form with foreign substances.

BRIEF DESCRIPTION OF DRAWINGS

FIG. 7 is a view showing an example of the arrangement that dynamically changes the relative positional relationship between the gas outlet 11 and the discharge nozzle 12 in the resin extrusion die according to the embodiment of the present invention;

DESCRIPTION OF EMBODIMENTS

The present invention will now be described in more detail with reference to the accompanying drawings.

Figure 1:
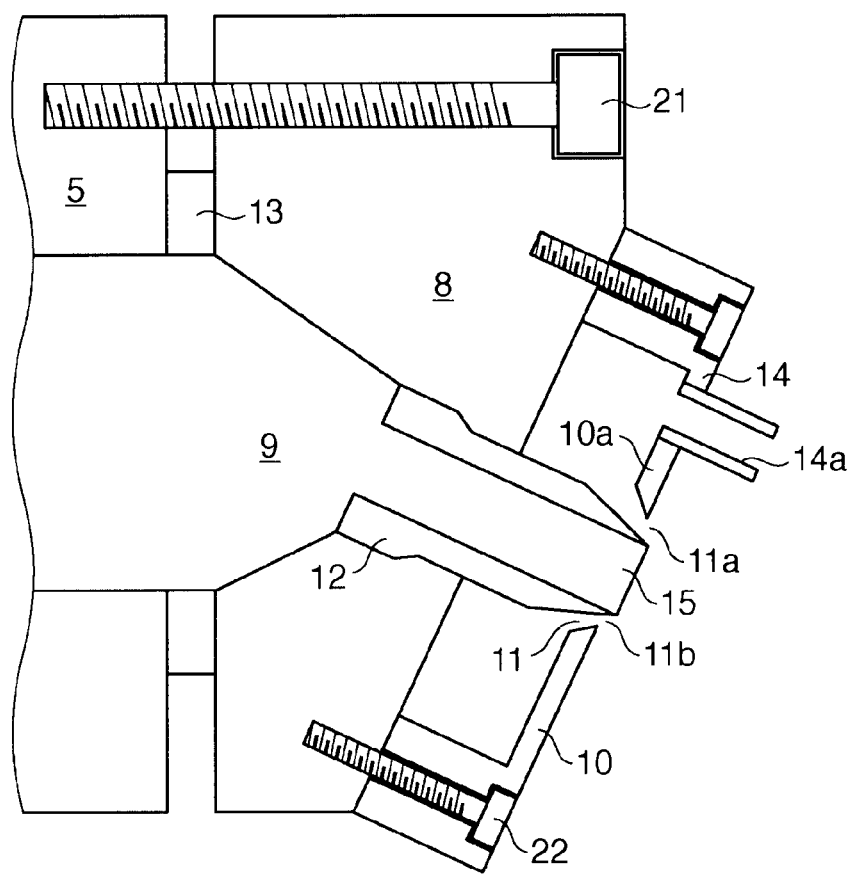
FIG. 1 is a vertical sectional view showing an arrangement example in which a resin extrusion die according to an embodiment of the present invention is attached to an extrusion apparatus.

FIG. 1 is a vertical sectional view showing an arrangement example in which a resin extrusion die according to an embodiment of the present invention is attached to an extrusion apparatus.

The resin extrusion die (to be simply referred to as a die hereinafter) includes a cap 8 attached to a die holder 5 of the extrusion apparatus by, for example, a screw 21, and a cover 10 attached to the cap 8 by, for example, screws 22.

The cap 8 is provided with a discharge nozzle 12 having an orifice 15. A molten resin supplied by a screw (not shown) into a channel 9 provided in the die holder 5 is extruded from the orifice 15 into a strand. An O-ring-shaped packing 13 is provided to fill in the gap between the die holder 5 and the cap 8 and thus prevent the high-pressure molten resin from leaking from the joint between the cap 8 and the die holder 5.

Note that although FIG. 1 that is a vertical sectional view illustrates only one discharge nozzle 12, a plurality of discharge nozzles 12 may be arranged at a predetermined interval in the direction perpendicular to the drawing surface. In the following description, the lower side of FIG. 1 is the lower side in the vertical direction, and the resin is extruded slightly downward from the horizontal direction. However, in the die of the embodiment, the resin extrusion direction is not limited, and the die attachment angle and/or the direction of the discharge nozzle 12 can arbitrarily be changed.

The cover 10 is attached to the cap 8 so as to form a space between the cover 10 and the cap 8. The cover 10 has, at the upper portion of its front surface, a gas supply port 14 configured to introduce a gas from a gas supply unit (not shown) into the cover 10. The gas is introduced from the gas supply unit into the cover 10 via a gas supply nozzle 14a attached to the gas supply port 14.

Note that the gas supply port 14 need not always be provided in the cover 10 if the gas can be supplied into the space between the cap 8 and the cover 10. For example, if the gas is supplied via the cap 8, the cover 10 need not have the gas supply port 14.

The cover 10 also has gas outlets 11 corresponding to the individual discharge nozzles 12. The gas outlet 11 is provided to cause the gas supplied from the gas supply port 14 into the space in the cover 10 to flow out of peripheral portions 11a and 11b of the discharge nozzle 12. An inner wall 10a of the cover 10 tapers to form a bowl-like shape toward the gas outlet 11 so as to gradually narrow the channel of the gas toward the gas outlet 11. Note that the cover 10 can be configured to cover at least part of the cap 8 so as to cause the gas supplied from the gas supply port 14 to flow out only from the gas outlet 11.

The gas outlet 11 of this embodiment makes a nonuniform flow velocity or flow rate distribution of the gas flowing out of the periphery of the discharge nozzle 12 by its shape or positional relationship with the discharge nozzle 12, thereby changing the outflow gas to a turbulent flow.

Figure 2:
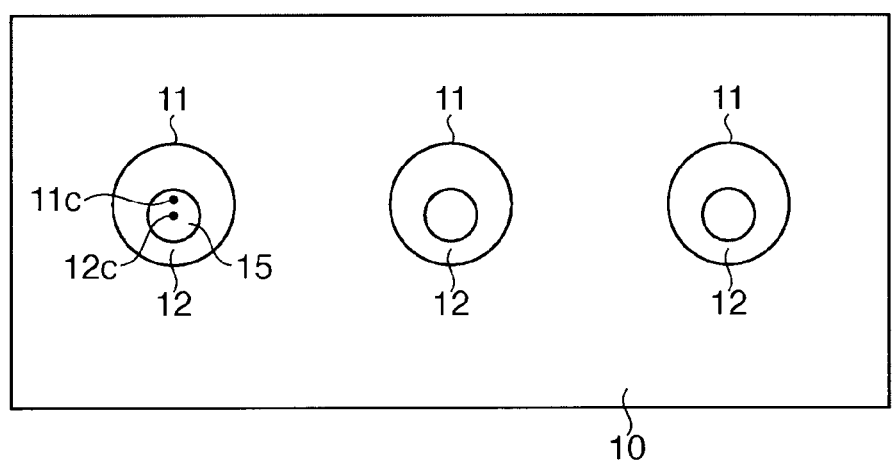
FIG. 2 is a front view showing the resin extrusion die according to the embodiment of the present invention viewed from the resin extrusion direction.

FIG. 2 is a front view showing the nozzle of the die according to the embodiment viewed from the front side of the resin extrusion direction. There is illustrated an example in which the cap 8 of the die has three discharge nozzles 12, and the cover 10 has three gas outlets 11 corresponding to the discharge nozzles 12.

In the example shown in FIG. 2, the gas outlet 11 has a circular shape whose diameter is larger than the outer diameter of the tip of the discharge nozzle 12. The gas outlet 11 forms a gap around the tip of the discharge nozzle 12. The section perpendicular to the resin extrusion direction has such a positional relationship that a center 11c of the gas outlet 11 is shifted upward from a center 12c of the circular discharge nozzle 12 (orifice 15). When the gas outlet 11 and the discharge nozzle 12 have this positional relationship, the width of the gap formed around the tip of the discharge nozzle 12 by the gas outlet 11 can be nonuniform. This makes the gas flowing out of the gap change to a turbulent flow, and die drool deposited at the tip of the discharge nozzle 12 is easily blown off. As can be seen from observations, the air stream that has changed to a turbulent flow vibrates small amount of die drool generated around the orifice 15 and blows it off at an early stage (when it is still a small piece). The die drool that has been blown off is not only small but also yet to degrade. For this reason, even if the die drool adheres to the surface of the strand extruded from the discharge nozzle 12, it is dispersed and diluted onto the surface of the strand not to be clearly recognizable as a foreign substance.

Note that although FIG. 2 illustrates the example in which the center 11c of the gas outlet 11 is shifted upward from the center 12c of the discharge nozzle 12, the center 11c may be shifted in an arbitrary direction from the center 12c of the discharge nozzle 12 in place of upward.

Figure 3:
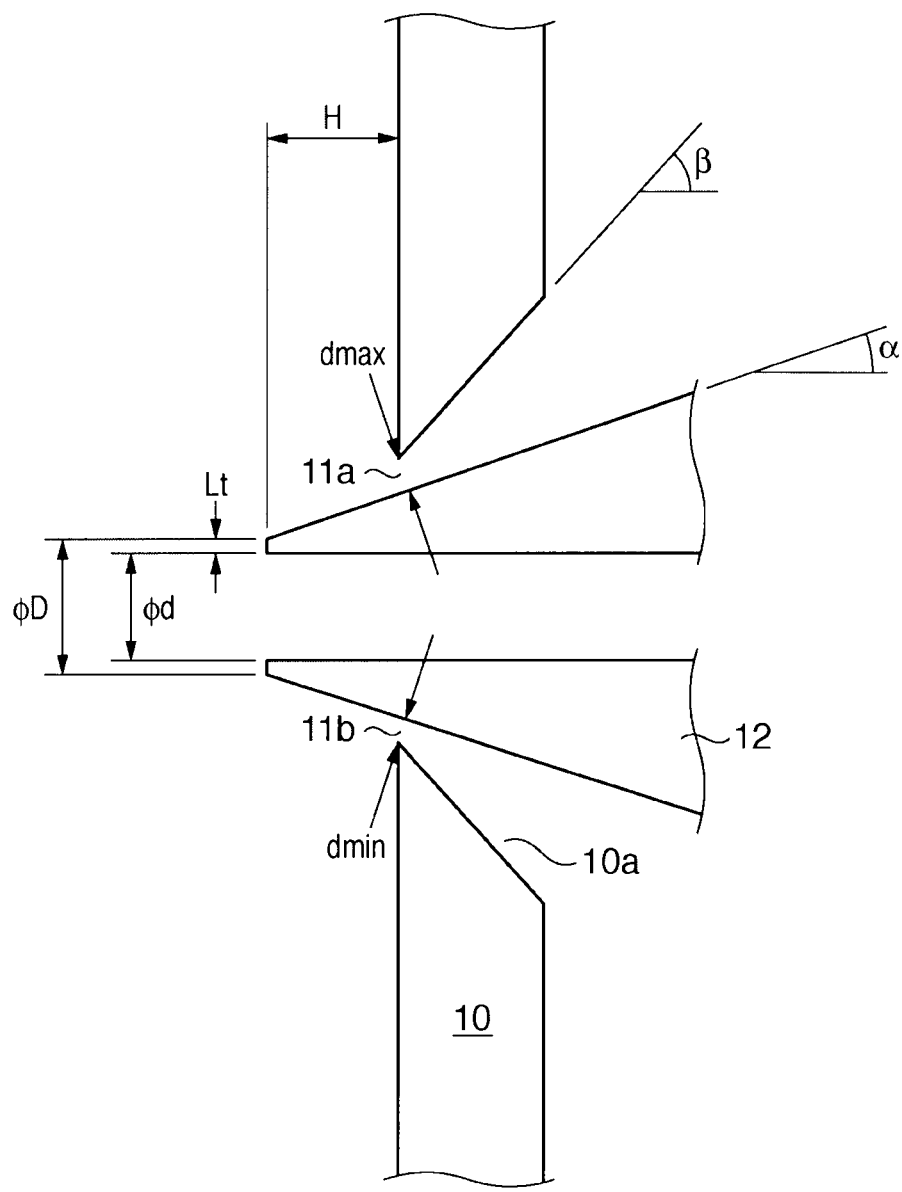
FIG. 3 is a vertical sectional view for explaining the positional relationship between a discharge nozzle 12 and a gas outlet 11 in FIG. 2 in more detail.

FIG. 3 is a vertical sectional view for explaining the positional relationship between the discharge nozzle 12 and the gas outlet 11 in FIG. 2 in more detail.

As described above, the width of the gap between the gas outlet 11 and the outer periphery of the tip of the discharge nozzle 12 is not uniform. In the example of FIG. 2, the gap is widest on the upper side in the vertical direction and narrowest on the lower side in the vertical direction. Let dmax be the maximum width of the gap between the gas outlet 11 and the outer periphery of the tip of the discharge nozzle 12, and dmin be the minimum gap width. The lower limit of dmax/dmin (>1.0) is preferably 1.05 or more. The upper limit of dmax/dmin is preferably 2.0 or less, and more preferably, smaller than 1.5. When dmax/dmin is smaller than 1.05, the gap width difference is small, and the effect of making a nonuniform flow velocity or flow rate distribution of the gas flowing out of the gap is insufficient. On the other hand, when dmax/dmin exceeds 2.0, and more particularly, when the value dmin is smaller, the flow velocity is insufficient at that portion, and die drool is readily adhered (readily deposited). From this viewpoint, dmin is preferably at least 0.1 mm.

An inner diameter φd of the discharge nozzle 12 preferably satisfies 7 mm≥φd≥2 mm. If φd is larger than 7 mm, the strand is too thick and easily breaks at the time of drawing, lowering the productivity. If φd is smaller than 2 mm, the pressure in the die extremely rises to result in easy vent-up.

Additionally, to suppress deposition of die drool at the tip of the discharge nozzle 12 (the edge of the orifice 15), the tip of the discharge nozzle 12 is tapered so as to decrease the wall thickness. A wall thickness Lt of the tip=(outer diameter φD−inner diameter φd)/2 is preferably as small as possible within the range that allows to maintain the strength.

Let α be the taper angle of the outer periphery of the tip of the discharge nozzle 12, and β be the taper angle around the gas outlet 11. α<β preferably holds to increase the flow velocity by reducing the sectional area of the gas channel toward the gas outlet 11. In addition, β−α is preferably 0.5° or more, more preferably 1.0 or more, and most preferably 3.0 or more. Furthermore, β−α is preferably 50° or less. If β−α exceeds 50°, the velocity of the air stream at the nozzle tip conversely lowers, reducing the effect of removing die drool.

The flow rate of the gas flowing out of each gas outlet 11 is preferably 5 to 100 L/min (5 to 100 L/min). If the flow rate is lower than 5 L/min, the flow velocity is insufficient, and no sufficient effect of suppressing adhesion of die drool can be obtained. A flow rate higher than 100 L/min may affect the extruded resin so that, for example, the resin strand may be cut by the wind pressure.

In the present invention, the gas is supplied such that the linear velocity of the gas flowing out of each gas outlet 11 becomes 4 to 100 m/sec. If the linear velocity is lower than 4 m/sec, the wind pressure is insufficient, and no sufficient effect of suppressing deposition of die drool can be obtained. A linear velocity higher than 100 m/sec may affect the extruded resin so that, for example, the resin strand may be cut by the wind pressure.

The temperature of the gas changes depending on the type, the softening point, the melting temperature, and the like of the resin to be extruded. An amorphous resin is preferably heated to (Tg (glass transition temperature)−100)° C. to (Tg+50)° C. For example, when polycarbonate is used as the resin, it is preferably heated to 50° C. to 200° C. A crystalline resin is preferably heated to (Tm (melting point)−150)° C. to Tm° C. For example, when polybutylene terephthalate is used as the resin, it is preferably heated to 70° C. to 220° C. More preferably, an amorphous resin is heated to (Tg−70)° C. to (Tg+30)° C., and a crystalline resin is heated to (Tm−120)° C. to Tm° C. With this temperature, it is possible to blow off die drool without solidifying and also eliminate the risk of adverse effects on the dice temperature. Although a gas at a higher temperature is also usable, no satisfactory effect can be expected. An extremely high gas temperature rather prompts degradation and discoloration of die drool generated in a small amount near the nozzle.

(Form Including Gap Adjusting Mechanism)

Figure 4:
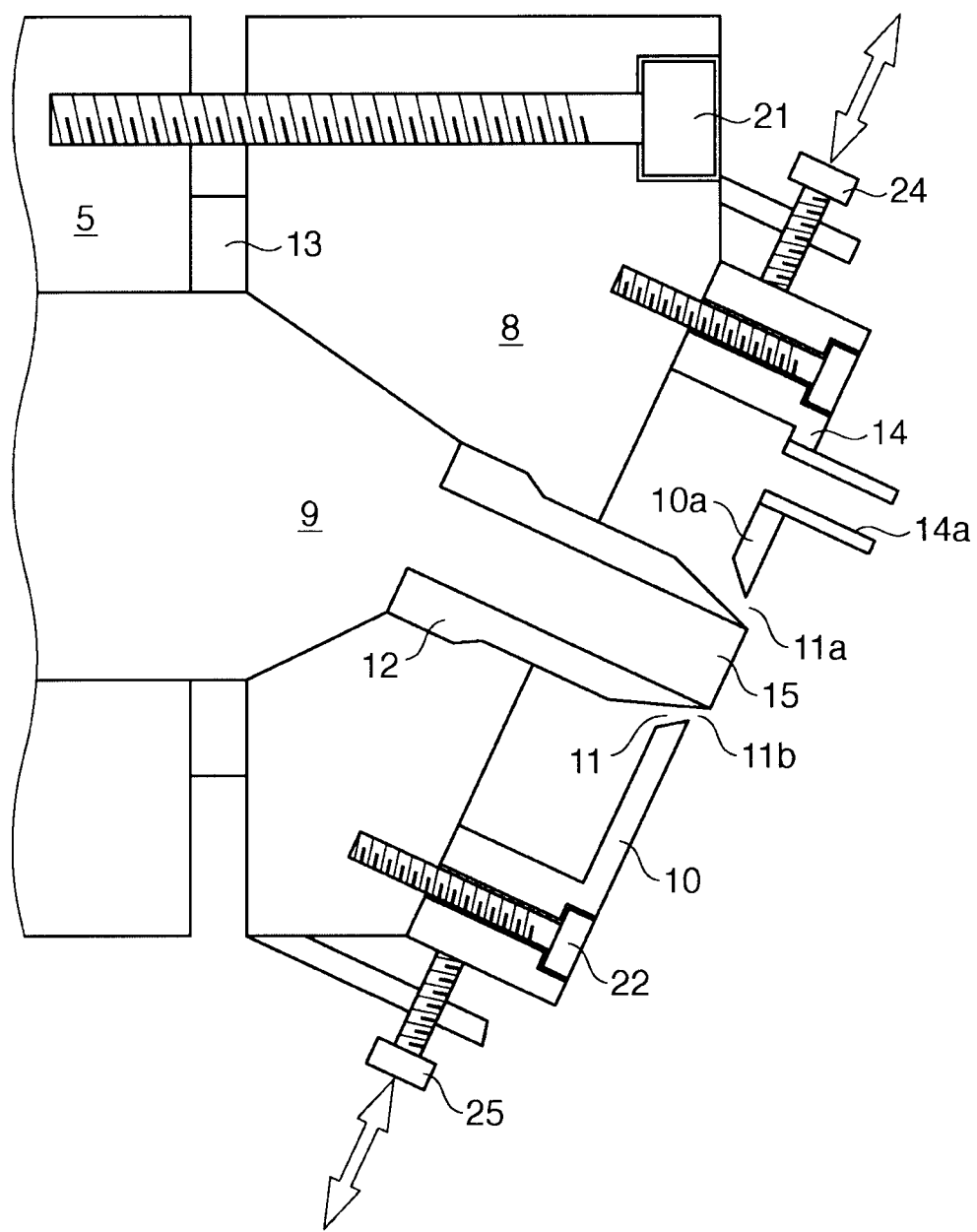
FIG. 4 is a view showing an example of the arrangement that allows the relative positional relationship between the gas outlet 11 and the discharge nozzle 12 in the resin extrusion die to be adjusted according to the embodiment of the present invention.

Note that the positional relationship between the gas outlet 11 and the discharge nozzle 12 may be adjustable. For example, as shown in FIG. 4, the diameter of the screw 22 is made smaller than that of the hole of the cover 10 so that the threaded portion of each screw 22 is spaced apart from the hole of the cover 10. That is, the cover 10 is fixed by the flat head portions of the screws 22. In this case, when the screws 22 are not tightened, the cover 10 can slightly move. In a state in which the screws 22 are slightly undone, screws 24 and 25 are adjusted. After the cover 10 is aligned by relatively moving its position in the vertical direction with respect to the cap 8, the screws 22 are tightened, thereby fixing the cover 10.

Note that FIG. 4 illustrates an example of the arrangement that allows to adjust the relative positional relationship between the gas outlet 11 and the discharge nozzle 12, and any other arbitrary arrangement can also be adopted. The adjustment may be enabled not only in the vertical direction but also in the horizontal direction.

(Control of Gas Outflow Direction by Shape of Gas Outlet)

An actual purpose of the present invention is to change the gas flowing out of the gap formed around the tip of the discharge nozzle 12 by the gas outlet 11 to a turbulent flow so that the distribution of at least one of the flow velocity and the flow rate becomes nonuniform in terms of at least one of the location and the time, thereby suppressing deposition of die drool. Another object is to temporally change the direction of the air stream resistance received by the deposited die drool, thereby easily removing even the deposited die drool.

An arrangement has been described above, in which the center 11c of the circular gas outlet 11 is shifted upward from the center 12c of the discharge nozzle 12 (orifice 15) having a circular section perpendicular to the resin extrusion direction so that the gas flowing out of the gap formed around the tipi of the discharge nozzle 12 by the gas outlet 11 changes to a turbulent flow.

Figure 5A:
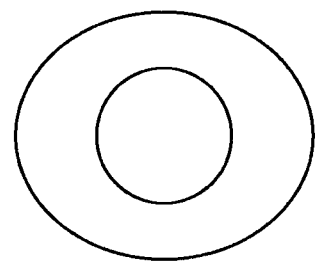
FIGS. 5A to 5D are views schematically showing examples of the shape of the gas outlet 11 configured to make a nonuniform flow velocity or flow rate distribution of the gas flowing out of the periphery of the discharge nozzle 12 in the resin extrusion die according to the embodiment of the present invention.

However, for example, the same effect can be implementing without using the circular gas outlet 11. FIGS. 5A to 5O schematically show examples of the shape of the gas outlet 11 configured to make a nonuniform flow velocity or flow rate distribution of the gas flowing out of the gap around the tip of the discharge nozzle 12.

Figure 5B:
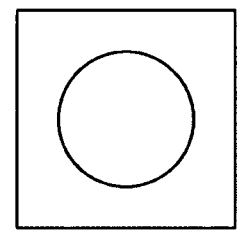
Figure 5C:
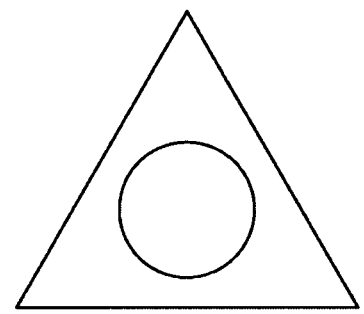
Figure 5D:
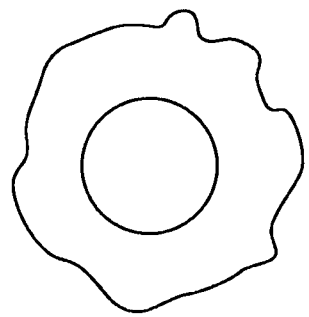

FIG. 5A shows an elliptic. FIG. 5B shows a square. FIG. 5C shows an equilateral triangle. FIG. 5D shows a shape in which the distance from the center periodically changes. Needless to say, these are merely examples, and any other arbitrary shape other than a circle (perfect circle) is employable. As an extension of the shape in FIG. 5D, the gas outlet 11 formed into a circular shape may be processed to be uneven. Alternatively, the gas outlet 11 may be formed into a circular shape, and the outer shape of the discharge nozzle 12 may be formed into a non-circular shape. However, it is practical to form the structure as shown in FIG. 2 in which the center 11c of the gas outlet 11 having a circular section is shifted from the center 12c of the discharge nozzle 12 having a circular section.

(Control of Gas Outflow Direction by Straightening Plates)

To more actively control the outflow direction of the gas from the gas outlet 11, straightening plates may be arranged inside the cover 10.

Figure 6A:
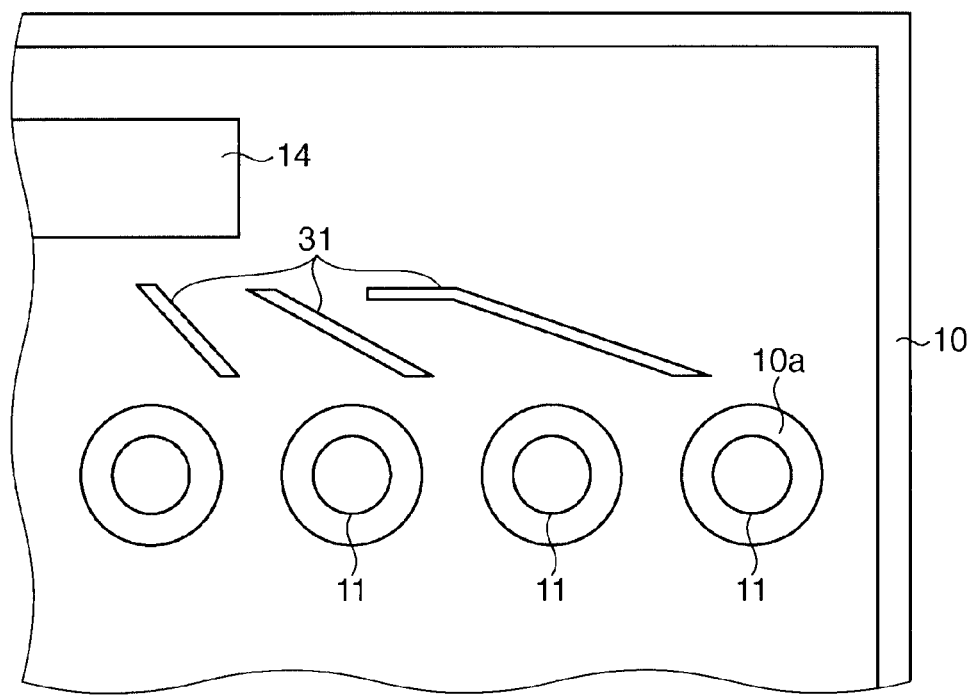
FIG. 6A is a vertical sectional view showing an arrangement example of the main part of a cover 10 provided with straightening plates in the resin extrusion die according to the embodiment of the present invention.

FIG. 6A is a vertical sectional view showing an arrangement example of the main part of the cover 10 provided with straightening plates. FIG. 6A shows the cover 10 viewed from the extrusion machine (from the side of the space formed between the cover 10 and the cap 8 of the die). As compared to the arrangement of FIG. 1, a wider space is formed between the gas supply port 14 and the gas outlets 11, and straightening plates 31 are provided to guide the gas from the gas supply port 14 to the respective gas outlets 11. The main function of the straightening plates 31 is to sufficiently supply the gas to the gas outlets 11 located at distant places. In the state in which the cover 10 is attached to the cap 8, depending on the positions of the straightening plates 31, the gas is blown to each discharge nozzle 12 obliquely from the upper side so as to form an air stream (swirl flow or vortex flow) swirling around the direction of resin extrusion. The direction of the gas flowing out of the gas outlet 11 thus contains components in more directions. For this reason, it is possible to further enhance the effect of suppressing deposition of die drools and blowing off deposited die drools at an early stage in combination with the effect of the positional relationship between the gas outlet 11 and the discharge nozzle 12. It is also possible to implement an effect of controlling the die drool blow-off direction to a direction different from the resin extrusion direction and making it difficult for the die drools to adhere to the surface of the strand.

(Control of Gas Outflow Direction by Another Method)

Figure 6B:
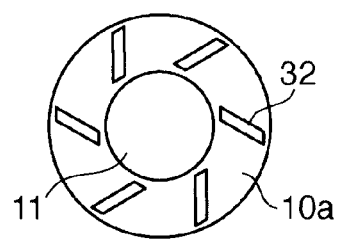
FIG. 6B is a view showing an example of straightening plates provided on an inner wall 10a of the cover 10 tapered around the gas outlet 11 in the resin extrusion die according to the embodiment of the present invention.

FIG. 6B is a view showing an example of gas control projections provided on the inner wall 10a of the cover 10 tapered around the gas outlet 11.

Referring to FIG. 6B, each of a plurality of control projections 32 is provided on the inner wall 10a to bias the flow of the gas toward the gas outlet 11 and form a counterclockwise swirl about the center of the gas outlet 11. This arrangement allows to change the gas flowing out of the gas outlet 11 to an air stream counterclockwise swirling around the discharge nozzle 12. It is therefore possible to further enhance the effect of suppressing deposition of die drool and blowing off deposited die drool at an early stage in combination with the effect of the positional relationship between the gas outlet 11 and the discharge nozzle 12. It is also possible to implement an effect of controlling the die drool blow-off direction to a direction different from the resin extrusion direction and making it difficult for the die drool to adhere to the surface of the strand.

Note that the same effects as described above can also be obtained by providing a spiral control groove in the inner wall 10a in place of the control projections 32.

Although at least one of the shape of the gas outlet 11 and forming the control projections or control groove suffices, both may be combined.

(Dynamic Control of Gap Width)

The above description has been done assuming that the positional relationship between the gas outlet 11 and the discharge nozzle 12 is fixed. However, the gap size may dynamically be controlled by dynamically changing the positional relationship.

FIG. 7 is a view showing the arrangement that dynamically changes the gap between the gas outlet 11 and the tip of the discharge nozzle 12 by vibrating the cover 10 in the vertical direction.

(Vibration Application)

The arrangement shown in FIG. 7 includes a vibration machine 30 for vibrating the cap 8. The vibration machine 30 includes a vibrating member (not shown) such as an actuator whose operation is controlled by a control circuit (not shown). In the operating state, the vibration machine 30 can vibrate the cap 8 (and the cover 10 attached to the cap 8) in the vertical or horizontal direction at a predetermined frequency and amplitude.

This enables to make a turbulence in the gas flowing out of the gas outlet 11 and stably form a turbulent flow. The vibration to be applied to the cap 8 preferably has an amplitude of 0.005 to 0.2 mm and a vibration velocity of 0.3 to 5 mm/sec. More preferably, the amplitude is 0.009 to 0.1 mm, and the vibration velocity is 0.4 to 4 mm/sec. A particularly preferable vibration velocity is 0.5 to 3 mm/sec. Note that the oscillation frequency (Hz) can be obtained by vibration velocity (mm/s)/(2π×amplitude (mm)). If the amplitude or the vibration velocity exceeds the upper limit, the extruded strand may largely vibrate. In this case, strands extruded from adjacent orifices may collide, or contact between the strands and cooling water may be unstable, impeding stable manufacture. Looseness of the screws 21 and 22 that fix the cap 8 and the cover 10 may also make the manufacture unstable. Below the lower limit, no sufficient effect of making a turbulent air stream by vibrations can be obtained.

Vibrating the cap 8 at a predetermined amplitude and vibration velocity is often an important condition from the viewpoint of die drool removing effect. That is, when the cap 8 vibrates, die drool is readily removed (blown off) from the tip of the discharge nozzle 12 at an early stage (when it is still a small piece), as compared to a case without vibration. In addition, since the extruded strand also vibrates, it is difficult for the die drool blown off by the air stream or vibration to adhere to the surface of the strand as a combined effect.

Note that FIG. 7 illustrates an example of the arrangement that forms a turbulent flow of the air stream flowing out of the gas outlet 11, and any other arrangement can also be adopted, as a matter of course. For example, instead of providing an active exciting member such as an actuator 135, the cap 8 (and the cover 10) may be vibrated using a vibration generated by the motor of the extrusion machine.

When the arrangement for vibrating the cap 8 (and the cover 10) is adopted, and no vibration is applied, the positional relationship that ensures a predetermined gap width between the gas outlet 11 and the periphery of the tip of the discharge nozzle 12 (without the shift of the center) can be obtained like the conventional arrangement. This is because when a vibration is applied, the tip of the discharge nozzle 12 vibrates, and its center is actually shifted from the central position of the gas outlet 11.

The arrangement for vibrating the cap 8 (and the cover 10) can also be combined with the arrangement using the gas outlet 11 having a shape changed as shown in FIGS. 5A to 5D or including the straightening plates as shown in FIGS. 6A and 6B. Note that the gas used in the present invention is not limited to air, and any other gas such as an inert gas, nitrogen, or water vapor may also be used.

(Further Details of Discharge Nozzle Arrangement)

Note that when a molten resin is formed into a strand using the resin extrusion die having the above-described arrangement, a plurality of discharge nozzles 12 are provided on the die. Discharge nozzles having a specific structure can effectively stabilize extrusion and prevent (remove) die drool or prevent cutting of strands.

In the specific structure, (1) a specific relationship holds between the inner diameter ϕd (the sectional area perpendicular to the extrusion direction) of each of the plurality of discharge nozzles and the sectional area (the sectional area perpendicular to the extrusion direction) of a manifold 120 provided on the rear side (the extrusion machine side) of the discharge nozzles to uniform the pressure of the molten resin to be supplied to the plurality of discharge nozzles, and (2) the length of the discharge nozzle satisfies a specific condition.

Figure 8A:
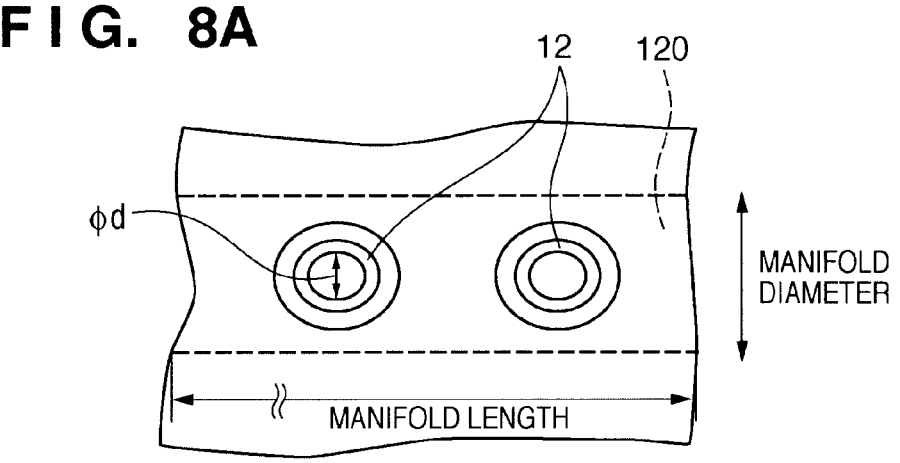
FIG. 8A is a front view showing two of the plurality of discharge nozzles 12 provided on the resin extrusion die according to the embodiment of the present invention.
Figure 8B:
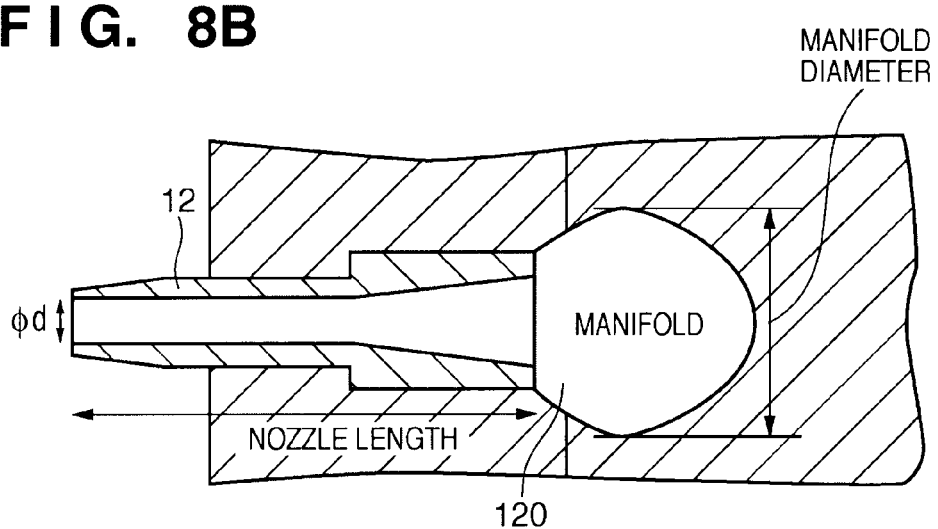
FIG. 8B is a longitudinal sectional view showing the discharge nozzle of the resin extrusion die according to the embodiment of the present invention.

FIG. 8A is a front view of two of the plurality of discharge nozzles 12. FIG. 8B is a longitudinal sectional view of a given discharge nozzle 12 (a vertical sectional view including the axis of the discharge nozzle regarded as a cylinder). When the die includes a plurality of discharge nozzles 12, the manifold 120 configured to supply the molten resin to the plurality of discharge nozzles 12 at a uniform pressure is normally provided on the rear side of the plurality of discharge nozzles 12. The molten resin is supplied to all discharge nozzles 12 via the common manifold 120. The molten resin to be supplied from the extrusion machine to the die is temporarily collected in the manifold 120 to uniform the pressure, and then drawn out of the thin discharge nozzles 12 so that the extrusion amounts from the discharge nozzles 12 become uniform. At this time, if the draw ratio of the discharge nozzle 12 is too low (if drawing is insufficient), the pressure applied to the discharge nozzles 12 becomes nonuniform. For this reason, the strands become unstable and break, and die drool adhered to the discharge nozzles 12 increases. If the draw ratio is too high, the resin-filled region at the tip of the screw of the extrusion machine is long. Hence, heat is generated upon shearing to raise the resin temperature, and the die drool generation increases. Similarly, if the discharge nozzle 12 is too short, the pressure applied to the discharge nozzles 12 becomes nonuniform. For this reason, the strands become unstable and break, and die drool adhered to the discharge nozzles 12 increases. Similarly, if the discharge nozzle 12 is too long, the resin temperature rises, and the die drool generation increases.

Hence, the balance between the draw ratio and the length of the discharge nozzle 12 greatly affects the strand stability and thus die drool generation.

The draw ratio from the manifold 120 to the discharge nozzles 12 can be represented by the ratio of a total area S1 of the minimum sectional areas of the discharge nozzles 12 to a maximum sectional area S2 of the manifold 120 (the maximum one of the sectional areas perpendicular to the extrusion direction each of which is given by the diameter of the manifold 120×the length of the manifold 120)=S1/S2.

Figure 8C:
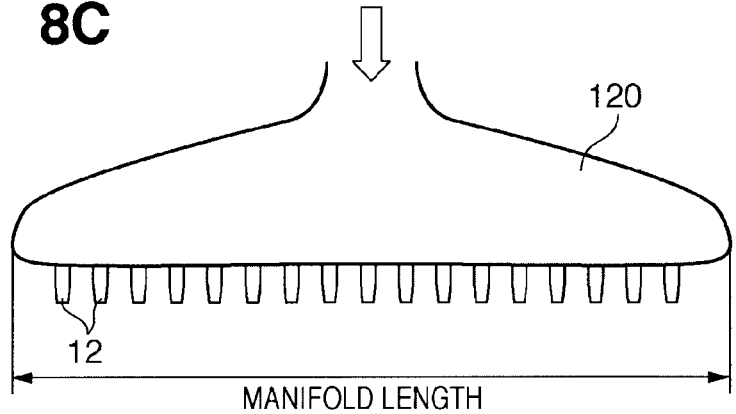
FIG. 8C is a view for explaining the arrangement of a manifold of the resin extrusion die according to the embodiment of the present invention.

The diameter of the manifold 120 is that shown in FIG. 8B, that is, the maximum vertical distance projected when the discharge nozzles 12 are viewed from the front side, and the length of the manifold 120 is the longitudinal distance as shown in FIG. 8C, although they slightly change depending on the shape of the manifold 120. Note that FIG. 8C schematically shows only the manifold 120 and the discharge nozzles to grasp the shape of the manifold 120 that is a hollow formed in the die.

The draw ratio represented by the ratio S1/S2 of the total area S1 of the minimum sectional areas of the discharge nozzles 12 to the maximum area S2 of the manifold 120 defined in the above-described way satisfies 10%≥S1/S2≥1.2%, and preferably, 8%≥S1/S2≥2%.

The length of the discharge nozzle 12 is 15 to 50 mm, and more preferably, 18 to 40 mm.

When the draw ratio S1/S2 and the length of the discharge nozzle 12 balance in this way, stable strand extrusion can be done to thus obtain the die drool suppression effect.

The discharge nozzle 12 generally has a structure with a section as shown in FIG. 8B. The inner diameter of the discharge nozzle 12 indicates the minimum diameter portion at the tip of the discharge nozzle 12 but not the diameter of the larger basal portion (on the side of the manifold 120). However, the length of the discharge nozzle 12 indicates not the length of only the minimum diameter portion but the length of the entire portion projecting from the manifold 120.

Figure 9A:
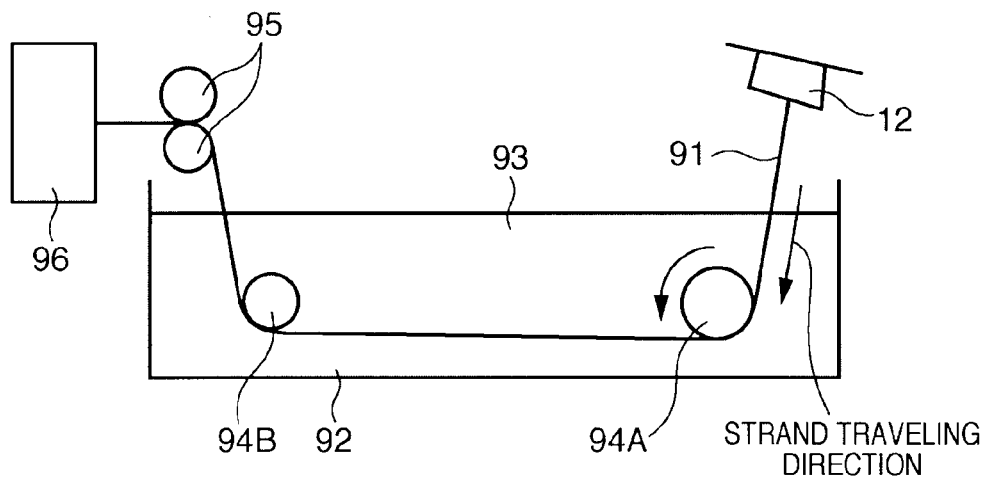
FIG. 9A is a view schematically showing an arrangement concerning the processes up to processing a strand extruded using the resin extrusion die according to the embodiment of the present invention into pellets.

FIG. 9A is a view schematically showing an arrangement concerning the processes up to processing a strand extruded from the discharge nozzle 12 into pellets.

A strand 91 is drawn by draw rollers 95 and processed (cut) into pellets by a pelletizer 96. The strand is normally cooled in the conveyance path before supplied to the pelletizer 96. More specifically, as shown in FIG. 9A, the strand is cooled while being conveyed through a cooling medium (normally, water) 93 stored in a cooling tank 92. To minimize degradation of the resin, the time until the strand 91 that has been extruded from the discharge nozzle 12 enters the cooling medium 93 is preferably short. Normally, the strand preferably enters the cooling medium 93 within 1 sec after extrusion from the discharge nozzle 12.

For this purpose, the strand is preferably conveyed from the discharge nozzle 12 to the cooling medium 93 in almost the shortest distance. The strand is also preferably conveyed such that the cooling time in the cooling medium 93 becomes long.

To implement the conveyance path that satisfies these conditions, the conveyance path of the strand 91 generally includes guide rollers as indicated by 94A and 94B. The diameter of the guide rollers 94A and 94B is normally about 3 to 7 cm.

Using the guide rollers 94A and 94B enables to remove die drool adhered to the surface of the strand 91.

More specifically, at least one of the guide rollers 94A and 94B is rotated in the direction reverse to the traveling (conveyance) direction of the strand 91 or rotated in the same direction as the traveling direction of the strand 91 at a peripheral velocity lower than the traveling speed (draw speed) of the strand 91 (alternatively, the strand 91 may be held without being rotated).

Each of the guide rollers 94A and 94B has a cylindrical shape whose axis of rotation normally matches the direction intersecting the traveling direction of the strand, and supports, on its cylindrical surface, the plurality of strands 91 extruded in parallel so that the strands 91 are conveyed through a desired conveyance path.

Figure 9B:
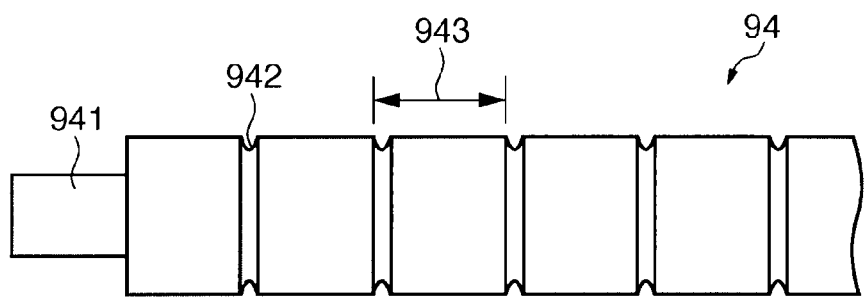
FIG. 9B is a view showing an example of the arrangement of a guide roller that conveys a strand.

The cylindrical surface of each of the guide rollers 94A and 94B has a plurality of annular (ring-shaped) grooves 942 in the circumferential direction, as shown in FIG. 9B. The grooves 942 receive and support the traveling strands 91 to prevent the strands 91 at near positions from coming into contact and fusing with each other.

Preferably, the groove 942 is slightly wider than the strand 91 and has an arc-shaped bottom portion for stable support. The grooves 942 are normally 2 to 10 mm deep although it depends on the diameter of the strand 91. The pitch of the grooves 942 (the interval between the adjacent grooves 942) is normally adjusted to the interval of the strands 91 (the interval of the discharge nozzles 12 of the die). The pitch is 5 to 20 mm although it depends on the diameter of the strand 91. The number of grooves 942 need only be equal to or larger than the number of extruded strands.

One or a plurality of guide rollers 94A and 94B are provided at the strand traveling positions in the cooling tank 92. When there is a plurality of guide rollers, the strands run between the guide rollers 94A and 94B and travel in the cooling tank 92 to be cooled.

The guide rollers 94A and 94B can be supported to be rotatable in the direction reverse to the traveling direction of the strands or in the same direction as the traveling direction. The guide rollers 94A and 94B may be supported not to be rotatable. When the guide rollers 94A and 94B are supported such that the moving (rotation) speed of the grooves 942 of the guide rollers 94A and 94B becomes slower than the traveling (conveyance) speed of the strands 91, the surface of the strand 91 is rubbed against the surface of the groove 942 that is in contact with the strand 91, thereby rubbing off the die drool adhered to the surface of the strand 91. Note that if there are a plurality of guide rollers 94, rubbing the surface of the strand 91 against at least one of the guide rollers suffices.

To rotate the guide rollers 94A and 94B in the direction reverse to the traveling direction of the strand, a driving device is provided for the guide rollers 94A and 94B. In this case, the traveling of the strand 91 may be unstable if the resistance between the strand 91 and the surface of the groove 942 is too large. Hence, the rotation amount is determined within the range in which traveling of the strand 91 stabilizes.

To rotate the guide rollers 94A and 94B in the same direction as the traveling direction, no driving device need be provided. A resistance to some degree (at least a resistance that is given by the frictional force of the traveling strand 91 to prevent the guide rollers from rotating at the same speed as that of the strand 91) need only be given to rotate the guide rollers 94A and 94B. This causes the guide rollers 94A and 94B to rotate following the traveling of the strand 91 at a speed (peripheral velocity) lower than the traveling speed of the strand 91 due to the given resistance. Hence, the surface of the groove 942 can be rubbed against the surface of the strand. Although the driving device may be provided, the arrangement for giving the resistance to rotation is simpler, unlike the case of reverse rotation.

As described above, the strand 91 comes into contact with the surfaces of the guide rollers 94A and 94B while traveling in the cooling medium 93. The surface of the strand 91 is rubbed against the surface of the groove 942 due to the difference between the traveling speed of the strand 91 and the rotational speed (peripheral velocity) of the guide rollers 94A and 94B, thereby removing the die drools adhered to the surface of the strand 91.

This effect cannot be obtained when the guide rollers 94A and 94B are rotated at the same peripheral velocity as the traveling speed of the strand 91. If the traveling speed of the strand 91 almost equals the peripheral velocity of the guide rollers 94A and 94B, the surface of the strand 91 cannot be rubbed. Indeed, the surface of the groove 942 may make the die drool adhere to the strand or bury the die drool in the strand. More specifically, a rotational (peripheral) speed Vr of the guide rollers 94A and 94B and a speed Vr of the strand preferably hold a relationship given by $0.7 \geq Vr/Vs \geq -0.2$. More preferably, the upper limit is $0.5 \geq Vr/Vs$, and the lower limit is $Vr/Vs \geq 0$. Vs can be the draw speed of the strand 91, and Vr is obtained by (radius of guide rollers 94A and 94B− groove depth)$\times 2\pi \times$rotational speed per min. If Vr/Vs is positive, the guide rollers 94A and 94B rotate in the same direction as the strand traveling direction. If Vr/Vs is negative, the guide rollers 94A and 94B rotate in the direction reverse to the strand traveling direction.

One or a plurality of guide rollers 94A and 94B are provided in the cooling tank. However, when a plurality of guide rollers are provided, not all the guide rollers need be rotated in the above-described way. To remove die drool, it is effective to thus actuate the guide roller (94A in FIG. 9A) that is located in the cooling medium 93 at the position nearest to the discharge nozzle 12 (dice).

(Effect of Present Invention in Multicomponent System)

The molten resin to be used to form a strand using the resin extrusion die of the present invention is not particularly limited. The molten resin can be a single thermoplastic resin component such as polycarbonate, polybutylene terephthalate, polyamide, polyphenylene ether, or polyacetal, or a mixture of a plurality of thermoplastic resins. A reinforcing filler may be mixed into the molten resin. Nonlimiting examples of the reinforcing filler are inorganic fibers such as a glass fiber, carbon fiber, silica-alumina fiber, zirconia fiber, boron fiber, boron nitride fiber, silicon nitride/potassium titanate fiber, and metallic fiber, and organic fibers such as an aromatic polyamide fiber and fluoroplastic fiber. Two or more of the reinforcing fillers can be used in combination.

Together with or independently of the reinforcing filler, another filler can be mixed into the molten resin. Nonlimiting examples of the other fillers are a tabular inorganic filler, ceramic beads, asbestos, Wollastonite, talc, clay, mica, zeolite, kaolin, potassium titanate, barium sulfate, titanium oxide, silicon oxide, aluminum oxide, and magnesium hydroxide. When mixed, a tabular inorganic filler out of the above-described materials can reduce the anisotropy and warping of a molded form. Nonlimiting examples of the tabular inorganic filler are glass flakes, mica, and a metal foil. Out of these materials, glass flakes are suitably used.

An anti-oxidant made of, for example, a phenolic compound such as 2,6-di-tert-butyl-4-octylphenol or pentaerythrityl-tetrakis[3-(3',5'-tert-butyl-4'-hydroxyphenyl)propionate], a thioether compound such as dilauryl-3,3'-thiodipropionate or pentaerythrityl-tetrakis(3-lauryl thiodipropionate), or a phosphorus compound such as triphenyl phosphite, tris(nonyphenyl) phosphite, or tris(2,4-di-tert-butylphenyl) phosphite, or a release agent such as paraffin wax, microcrystalline wax, polyethylene wax, a long chain fatty acid or an ester thereof represented by a montanic acid or montanic acid ester, or silicone oil may be added to the molten resin.

In addition, a fire retardant can be mixed to give fire retardancy to the resin. Nonlimiting examples of the fire retardant are an organic halide, an antimony compound, a phosphorus compound, and other organic fire retardants and inorganic fire retardants. Examples of the organic halide are brominated polycarbonate, brominated epoxy resin, brominated phenoxy resin, brominated polyphenylene ether resin, brominated polystyrene resin, brominated bisphenol A, and pentabromobenzyl polyacrylate. Examples of the antimony compound are antimony trioxide, antimony pentoxide, and sodium antimonate. Examples of the phosphorus compound are phosphoric ester, polyphosphoric acid, ammonium polyphosphate, and red phosphorus. Examples of the other organic fire retardants are nitrogen compounds such as melamine and cyanuric acid. Examples of the other inorganic fire retardants are aluminum hydroxide, magnesium hydroxide, a silicon compound, and a boron compound.

It is also possible to mix a thermoplastic resin such as polyethylene, polypropylene, polystyrene, polyacrylonitrile, polymethacrylate, ABS resin, polycarbonate, polyamide, polyphenylene sulfide, polyethylene terephthalate, or liquid crystalline polyester or a thermosetting resin such as phenol resin, melamine resin, silicone resin, or epoxy resin as needed. Two or more of the thermoplastic resins and thermosetting resins may be used in combination.

As described above, the resin extrusion die of the present invention is applicable to extrude various kinds of molten resins. However, it is especially effective to apply the die to a molten resin that readily generates die drool, as a matter of course.

Die drool generation is minimal when the molten resin contains a single component. For example, when extruding a molten resin made of a single thermoplastic resin component such as polycarbonate, polybutylene terephthalate, polyamide, polyphenylene ether, or polyacetal, the die drool generation amount is small.

However, when another component such as a reinforcing filler, a filler, a fire retardant, or another thermoplastic resin or thermosetting resin described above is added to the molten resin of the thermoplastic resin, die drool becomes conspicuous. If the molten resin contains 5% or more of the other component, the die drool generation amount increases. If the molten resin contains 10% or more of the other component, the die drool becomes conspicuous. When the resin extrusion die of the present invention is used to extrude a molten resin containing 5% or more another component, a remarkable effect of suppressing generation of die drool and contamination by it can be obtained.

(Effect of Release Agent)

Adding a release agent such as paraffin wax, microcrystalline wax, polyethylene wax, a long chain fatty acid or an ester thereof represented by a montanic acid or montanic acid ester, or silicone oil to the molten resin to be extruded into a strand using the resin extrusion die of the extrusion method allows to further reduce die drool generation. This is because the release agent contained in the molten resin functions as a lubricant between the nozzle surface and the molten resin at the orifice outlet, making it difficult for the molten resin to adhere to the nozzle (suppressing die drool generation to some degree). If the molten resin contains 0.03% or more the release agent, the die drool suppression effect appears. Especially when the release agent is added 0.1% or more, a conspicuous die drool suppression effect can be obtained. On the other hand, adding the release agent more than 1% cannot so largely improve the effect. For this reason, the content is preferably 1% or less from the viewpoint of cost.

(Combination with Extrusion Method Using Barus Effect)

Die drool generation and deposition can further be suppressed using the Barus effect (also called die swell) that is a phenomenon in which the extruded molten resin composition expands.

Figure 10A:
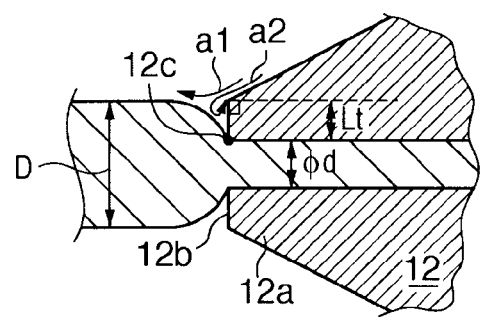
FIG. 10A is a view schematically showing an example of the shape of the discharge nozzle tip and the Barus effect.

FIG. 10A is a view schematically showing an example of the shape of the discharge nozzle tip and the Barus effect. Let $\phi d$ be the diameter of the molten resin in the discharge nozzle 12 (=the inner diameter of the discharge nozzle 12), and D be the diameter of the molten resin extruded from the discharge nozzle 12 and expanded. At this time, $D > \phi d$ holds. This phenomenon in which the extruded molten resin composition expands is known as the Barus effect (also called die swell). This occurs due to the viscoelasticity of the extruded molten resin.

If the wall thickness Lt of the tip of the discharge nozzle 12 is large, an end face 12b that is formed at a tip 12a of the discharge nozzle 12 to be almost perpendicular to the resin extrusion direction becomes large. The gas flowing out of the gas outlet 11 around the discharge nozzle 12 flows along the outer periphery of the discharge nozzle 12. Then, the gas is split into an air stream a1 flowing toward the extruded molten resin and an air stream a2 swirling back to the rear side of the end face 12b. When the end face 12b is large, a region 12c the swirling air stream a2 does not reach is generated, and the die drool is supposed to readily adhere to the region 12c.

To reduce the almost perpendicular end face 12b, the wall thickness Lt of the tip 12a of the discharge nozzle 12 is preferably small. More specifically, 0<wall thickness Lt<2 mm preferably holds. If the wall thickness Lt exceeds 2 mm, it is difficult to sufficiently obtain the effect of blowing the gas to the outer periphery near the tip of the discharge nozzle 12 because of the above-described reason.

Figure 10B:
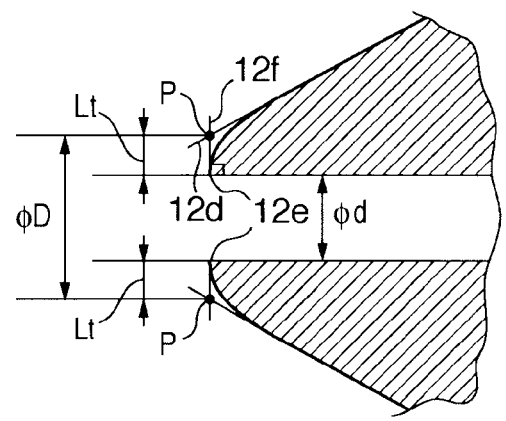
FIGS. 10B to 10D are views showing other shape examples of the discharge nozzle tip and definitions of the wall thickness of the discharge nozzle tip of the resin extrusion die according to the embodiment of the present invention.

Note that to reduce the end face 12b almost perpendicular to the resin extrusion direction (to actually reduce the size to 0 mm), the shape of the tip 12a of the discharge nozzle 12 may be processed. Note that the end face 12b actually having a size of 0 mm means the wall thickness Lt of about 0.05 mm or less. For example, when the outer peripheral surface of the tip 12a is processed into a curved surface (so-called rounded portion), as shown in FIG. 10B, the surface almost perpendicular to the resin extrusion direction can actually be eliminated. The rounded portion may be a so-called "chamfered surface" in place of the curve. In the shape of FIG. 10B, the wall thickness Lt of the tip 12a can be obtained by using, as $\phi D$ of $Lt = (\phi D - \phi d)/2$ described above, the interval between intersections P of a line 12f passing through two points 12e at the extreme end of the tip 12a and extensions 12d of the lines formed by the outer peripheral surface in the vertical section along the longitudinal central axis of discharge nozzle 12.

The wall thickness Lt is preferably as close to 0 as possible. However, deformation or defect of the tip 12a may be a fatal flaw. For this reason, when employing the structure shown in FIG. 10B, the wall thickness Lt is preferably 0.03 mm or more.

Figure 10C:
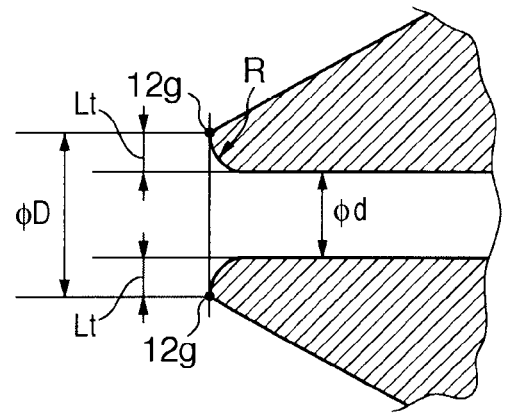
Figure 10D:
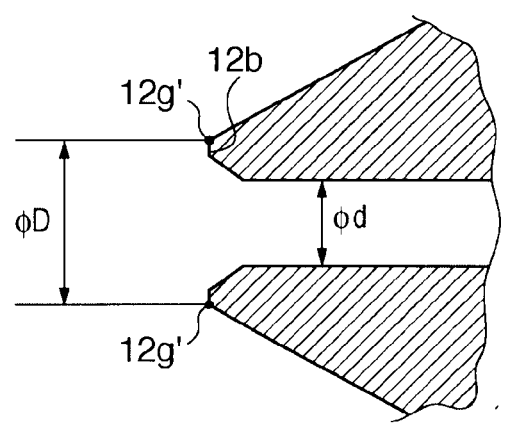

FIG. 10C shows another example of the process for reducing the end face 12b almost perpendicular to the resin extrusion direction. In FIG. 10C, instead of processing the tip 12a into a curved surface, the portion corresponding to the end face 12b is processed into a curved bowl-like shape toward the nozzle center. In this case, $\phi D$ that defines the wall thickness Lt can be defined as the interval between two points 12g at the extreme end of the tip 12a in the vertical section along the longitudinal central axis of discharge nozzle 12. Note that when the end face 12b exists, $\phi D$ can be defined as the maximum interval between the two points at the extreme end (the interval between points 12g'), as shown in FIG. 10D.

Note that a rounded portion (R indicated by an arrow) is preferably formed on the inner surface at the nozzle tip. Formation of the rounded portion prompts smooth expansion of the resin (augmentation and expansion caused by the Barus effect) and greatly serves to prevent deposition of die drool. The size of the rounded portion (the radius that defines the rounded portion) is suitably 0.005 to 1 mm. If a so-called chamfered surface is formed by making the rounded surface flat, the surface width is suitably 0.005 to 1 mm.

When suppressing die drool generation and deposition using the Barus effect, the component of the thermoplastic resin composition to be extruded into a strand is not particularly limited. Complying with JISK7199, the shearing viscosity measured at a temperature of 280° C. and a shear rate of 100/sec preferably ranges from 50 Pa·sec to 5,000 Pa·sec. More preferably, the shearing viscosity measured under this condition ranges from 80 Pa·sec to 3,000 Pa·sec.

When the shearing viscosity is less than 50 Pa·sec, the viscosity is low, and the Barus effect is small. For this reason, it is impossible to sufficiently obtain the effect of suppressing die drool deposition even by discharge amount control to be described later. On the other hand, when the shearing viscosity exceeds 5,000 Pa·sec, heat is readily generated. Since the resin thermally decomposes and foams, the strand easily breaks. The thermal decomposition also leads to an increase in the die drool generation amount.

Figure 11A:
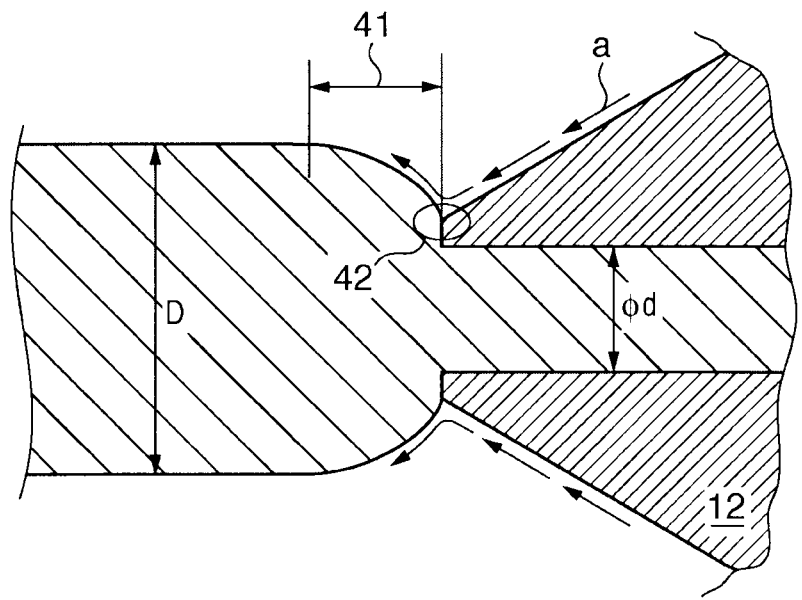
FIGS. 11A and 11B are views for explaining the principle of suppressing generation and deposition of die drool using the Barus effect in the embodiment of the present invention.

Selecting a resin having a large Barus effect or changing the molding condition (for example, setting a relatively low draw speed) enables molding as shown in FIG. 11A. In this molding, an extreme Barus effect is obtained so that the strand surface is rubbed against the almost perpendicular end face 12b of the nozzle tip 12a. Since generated die drool immediately adheres to the strand surface and moves before degradation, die drool deposition on the nozzle tip 12a is suppressed.

(Discharge Amount)

The discharge amount of the molten resin (composition) is controlled to control the increase in the diameter by the Barus effect (die swell ratio) such that the air stream flowing from the gas outlet 11 along the outer periphery of the discharge nozzle 12 is blown to the expanded portion of the strand, thereby changing the direction of the air stream. This allows the gas having a sufficient wind pressure to hit the portion where the molten resin composition separates from the discharge nozzle (the portion where die drool is readily generated), thereby further suppressing die drool deposition. Note that the effect of suppressing die drool deposition is attained by blowing off generated die drool that is still a small piece, not to mention by suppressing die drool generation itself.

The expanded portion of the strand means a section 41 shown in FIG. 11A, in which the molten resin (composition) extruded from the orifice of the discharge nozzle 12 (diameter=the inner diameter φd of the discharge nozzle 12) expands up to an almost predetermined diameter D. In other words, the portion where the diameter of the molten resin continuously increases is due to the Barus effect.

The present inventor has examined and found that setting the lower limit of the discharge amount of the molten resin (composition) from the discharge nozzle to 14 kg/hr or more, preferably to 17 kg/hr or more, and more preferably to 19 kg/hr or more, and the upper limit to 40 kg/hr or less, preferably to 30 kg/hr or less, and more preferably to 24 kg/hr or less makes it possible to obtain a satisfactory Barus effect for a thermoplastic resin (composition) having the above-described shearing viscosity and thus prevent die drool from being generated and contaminating a resin product.

Figure 11B:
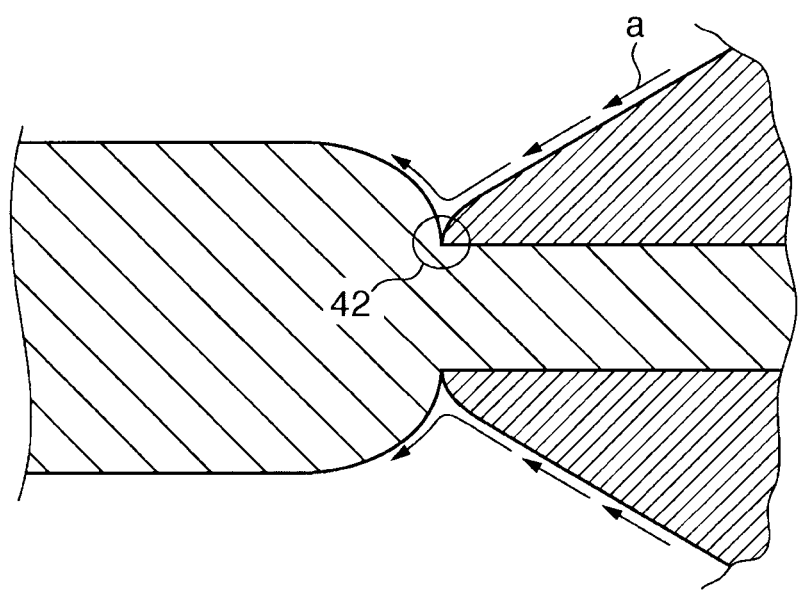

As shown in FIGS. 11A and 11B, the expanded portion of the resin strand serves as a wall for an air stream a and, more particularly, the component flowing out of the gas outlet 11 along the outer peripheral surface of the discharge nozzle 12. Hence, the air stream changes its direction upon hitting the expanded portion so that the pressure of the gas acts on the portion where the strand separates from the discharge nozzle 12 and its vicinity, that is, the portion indicated by reference numeral 42 where die drool is readily generated. This is supposed to effectively implement the die drool deposition suppression effect by the air stream.

When the discharge amount is smaller than 14 kg/hr or exceeds 40 kg/hr, no sufficient effect of preventing generation of die drool and contamination of a resin product with the generated die drool can be obtained.

Note that if the cap 8 includes a plurality of discharge nozzles 12, the discharge amount indicates the discharge amount per discharge nozzle.

Especially, the diameter expansion ratio (die swell ratio) =D/φd by the Barus effect is preferably 1.05 or more. More preferably, the discharge amount is controlled to obtain a ratio of 1.1 or more. The die swell ratio is preferably 1.35 or less. To obtain a die swell ratio more than 1.35, the discharge amount needs to be increased, resulting in easy die drool generation. More preferably, the die swell ratio is 1.30 or less.

The die swell ratio is obtained in the following way. The resin strand during molding and the nozzle tip (inner diameter) without molding are photographed from the same position. The maximum strand diameter (φD) within 2 cm from the nozzle tip and the nozzle inner diameter (φd) are actually measured from the photos. The diameter ratio (φD/φd) is defined as the die swell ratio.

EXAMPLES

The present invention will be described below in detail using examples. However, the present invention is not limited to these examples.

Example 1

A resin extrusion die as shown in FIGS. 1 to 3 was manufactured using die steel SKD11. Note that the gas outlet 11 had a circular shape with a diameter of 5.3 mm. In FIG. 3, dmin=0.5 mm, dmax=0.55 mm (that is, dmax/dmin=1.1), φd=3 mm, φD=3.2 mm, α=25°, β=35°, and H=1 mm.

TEM37BS available from Toshiba was used as the extrusion machine. The discharge amount was 50 kg/hr, and the screw speed was 300 rpm. A resin composition (resin composition A: the shearing viscosity at a temperature of 280° C. and a shear rate of 100/sec was 1,300 Pa·sec) containing 30 wt % glass fiber (FT737 available from Owens Corning) and 70 wt % polycarbonate (Iupilon S3000 available from Mitsubishi Engineering-Plastics) was used as a resin.

The resin was extruded while setting the cylinder of the extrusion machine and the resin extrusion die to 250° C. The resin temperature is supposed to be about 30° C. higher than the set die temperature.

In addition, air heated to 150° C. was supplied from a gas supply port 14 so that the flow rate from each gas outlet was 10 L/min at room temperature.

Extrusion was performed continuously for three hours. Small die drool was observed two hours after the start of extrusion. However, the die drool that was still small piece was blown off and not deposited in a large amount. Some of the die drool blown off appeared to have adhered to the surfaces of the extruded strands, though contamination of the molded form (pellets, in this case) with foreign substances (resin composition A with changed properties) was not detected. The die drool is supposed to have been dispersed and absorbed in the strand surface because it was still small and yet to degrade. Three hours later, small die drool adhered to the tips of three discharge nozzles was collected. It proved to weigh only 1 mg by measurement.

Example 2

Resin extrusion was performed under the same conditions as in Example 1 except that a resin composition (resin composition B: the shearing viscosity at a temperature of 280° C. and a shear rate of 100/sec was 340 Pa·sec) containing 30 wt % glass fiber (183H-13P available from Owens Corning) and 70 wt % polybutylene terephthalate (Novarex 5008 available from Mitsubishi Engineering-Plastics) was used as a resin.

In continuous extrusion of three hours, small die drool was observed two hours after the start of extrusion. However, the die drool that was still small pieces was blown off and not deposited in a large amount. Some of the die drool blown off appeared to have adhered to the surfaces of the extruded strands, though contamination of the molded form (pellets, in this case) with foreign substances (resin composition B with changed properties) was not detected. The die drool is supposed to have been dispersed and absorbed in the strand surface because it was still small and yet to degrade. Three hours later, small die drool adhered to the tips of three discharge nozzles was collected. IT proved to weigh only 2 mg by measurement.

Example 3

Resin extrusion was performed under the same conditions as in Example 1 except that a resin composition (resin composition C: the shearing viscosity at a temperature of 280° C. and a shear rate of 100/sec was 370 Pa·sec) containing 30 wt % glass fiber (T-249H available from Nippon Electric Glass) and 70 wt % polyamide (Novamid 1010J available from Mitsubishi Engineering-Plastics) was used as a resin.

In continuous extrusion of three hours, small die drool was observed two hours after the start of extrusion. However, the die drool that was still small piece was blown off and not deposited in a large amount. Some of the die drool blown off appeared to have adhered to the surfaces of the extruded strands, though contamination of the molded form (pellets, in this case) with foreign substances (resin composition C with changed properties) was not detected. The die drool is supposed to have been dispersed and absorbed in the strand surface because it was still small and yet to degrade. Three hours later, small die drool adhered to the tips of three discharge nozzles was collected. It proved to weigh only 1 mg by measurement.

Example 4

Extrusion was performed as in Example 1 except that a gas outlet 11 of a cover 10 had a circular shape with a diameter of 5.5 mm, dmin=0.5 mm, and dmax =0.75 mm (dmax/dmin=1.5).

In continuous extrusion of three hours, small die drool was observed one hour after. However, contamination of the molded form with foreign substances was not confirmed. Three hours later, small die drool adhered to the tips of three discharge nozzles was collected. It proved to weigh 3 mg by measurement.

Example 5

Extrusion was performed as in Example 1 except that the flow rate from each gas outlet was set to 4 L/min at room temperature.

In continuous extrusion of three hours, small die drool was observed one hour after. However, contamination of the molded form with foreign substances was not confirmed. Three hours later, small die drool adhered to the tips of three discharge nozzles was collected. It proved to weigh 4 mg by measurement.

Example 6

Extrusion was performed as in Example 1 except that dmin=1.1 mm and dmax=1.21 mm without changing dmax/dmin=1.1.

In continuous extrusion of three hours, small die drool was observed one hour after. However, contamination of the molded form with foreign substances was not confirmed. Three hours later, small die drool adhered to the tips of three discharge nozzles was collected. It proved to weigh 5 mg by measurement.

Comparative Example 1

Extrusion was performed as in Example 1 except that dmin=0.5 mm and dmax=0.5 mm (that is, dmax/dmin=1.0), and the width of the gap between a projecting nozzle 12 and a gas outlet 11 was uniform.

Die drool was observed within one hour after the start of continuous extrusion of three hours, and contamination of the molded form with foreign substances (resin composition A with changed properties) was confirmed. Three hours later, die drool adhered to the tips of three discharge nozzles was collected. It proved to weigh 16 mg by measurement.

Comparative Example 2

Extrusion was performed as in Example 1 except that dmin=0.5 mm and dmax=1.25 mm (that is, dmax/dmin=2.5), and the width of the gap between a projecting nozzle 12 and a gas outlet 11 was uniform.

Die drool was observed several minutes after the start of continuous extrusion of three hours, and contamination of the molded form with foreign substances (resin composition A with changed properties) was confirmed. Three hours later, die drool adhered to the tips of three discharge nozzles was collected. It proved to weigh 23 mg by measurement.

Example 7

A resin composition A was extruded under the same conditions as in Example 1 except that a compact electrodynamic vibration test equipment (Wave Maker 01 available from ASAHI Seisakusho) serving as a vibration machine 30 shown in FIG. 7 was attached to the cap portion of a resin extrusion die to apply a vibration with a frequency of 20 Hz and an output of 50% in the vertical direction. The vibration amount and vibration velocity of the cap were measured by pushing a pocketable vibration meter VM-63A "RIOVIBRO" available from RION against the cap. The amplitude was 0.01 mm, and the vibration velocity was 1.0 mm/sec.

In continuous extrusion of three hours, die drool generation and contamination of the molded form with foreign substances (resin composition A with changed properties) were not detected.

Comparative Example 3

A resin composition A was extruded under the same conditions as in Example 1 except that a full-scale electrodynamic vibration test equipment (Big Wave available from ASAHI Seisakusho) serving as a vibration machine 30 shown in FIG. 7 was attached to the cap portion of a resin extrusion die to apply a vibration with a frequency of 20 Hz and an output of 50% in the vertical direction. The amplitude and vibration velocity of the cap were measured in the same way as in Example 7. The amplitude was 0.3 mm, and the vibration velocity was 35 mm/sec.

Extruded strands largely vibrated, and adjacent strands were collided and fused. Since the strands were cut in that state to yield pellets in a shape of two pellets bonded together, the experiment was stopped three minutes after the start of extrusion. This method was determined to be impossible because no separate pellets were obtained.

Example 8

A resin composition A was extruded under the same conditions as in Example 1 except that 0.3 parts by weight a release agent (low molecular weight polyethylene HW100P available from Mitsui Petrochemical Industries) was added to 99.7 wt % a resin composition A. In continuous extrusion of three hours, die drool generation and contamination of the molded form with foreign substances (resin composition A with changed properties) were not detected.

The conditions and evaluation results of the above-described examples and comparative examples are as follows.

TABLE 1

|  | dmax/dmin | Gas flow rate L/(min · port) | dmin (mm) | (φD − φd)/2 (mm) | Material | Result | Die drool amount (mg) |
|---|---|---|---|---|---|---|---|
| Example 1 | 1.1 | 10 | 0.5 | 0.1 | A | ○ | 1 |
| Example 2 | 1.1 | 10 | 0.5 | 0.1 | B | ○ | 2 |
| Example 3 | 1.1 | 10 | 0.5 | 0.1 | C | ○ | 1 |
| Example 4 | 1.5 | 10 | 0.5 | 0.1 | A | Δ | 3 |
| Example 5 | 1.1 | 4 | 0.5 | 0.1 | A | Δ | 4 |
| Example 6 | 1.1 | 10 | 1.1 | 0.1 | A | Δ | 5 |
| Example 7 | 1.1 | 10 | 0.5 | 0.1 | A | ◉ | 0 |
| Example 8 | 1.1 | 10 | 0.5 | 0.1 | A | ◉ | 0 |
| Comparative Example 1 | 1.0 | 10 | 0.5 | 0.1 | A | X | 16 |
| Comparative Example 2 | 2.5 | 10 | 0.5 | 0.1 | A | XX | 23 |

◉ Die drool generation and contamination of the molded form with foreign substances were not confirmed even after the elapse of three hours.
○ Small die drools were confirmed two hours later, but contamination of the molded form with foreign substances was not confirmed.
Δ Small die drools were confirmed one hour later, but contamination of the molded form with foreign substances was not confirmed.
X Die drools were confirmed within one hour, and contamination of the molded form with foreign substances was also confirmed.
XX Die drools were confirmed several minutes later, and contamination of the molded form with foreign substances was also confirmed.
Die drool amount: die drools adhered to the tips of three discharge nozzles were collected after extrusion of three hours, and their weight was measured.

Example 9

A resin extrusion die as shown in FIGS. 1 to 3 was manufactured using a resin composition A and a die steel SKD11. Note that a gas outlet 11 had a circular shape with a diameter of 5.3 mm. In FIG. 3, dmin=0.5 mm, dmax=0.55 mm (that is, dmax/dmin=1.1), φd=3 mm, φD=3.2 mm, α=25°, β=35°, and H=1 mm. Three 25-mm long discharge nozzles 12 were provided. The maximum sectional area of the manifold was 670 mm$^2$ (the nozzle opening ratio was 3.2%).

In addition, air heated to 150° C. was supplied from a gas supply port 14 so that the flow rate from each gas outlet was 10 L/min at room temperature (the average linear velocity of the air stream in the circumferential direction of the nozzle was 20 m/sec). Resin extrusion was done by setting the resin discharge amount per discharge nozzle to 16.7 kg/hr.

The vibration amount and vibration velocity of the cap were measured by pushing a pocketable vibration meter VM-63A "RIVIBRO" available from RION against the cap. The amplitude was 0.008 mm, and the vibration velocity was 0.42 mm/sec.

The extruded resin strand was photographed. A maximum diameter D of the strand within 2 cm from the die proved to be 3.51 mm by measurement. Since the inner diameter φd of the discharge nozzle was 3 mm, the ratio of the increase in the diameter by the Barus effect (die swell ratio) D/φd was 1.17 (since the resin strand stopped expanding within 2 cm after extrusion, the maximum diameter of the strand within 2 cm from the die was measured).

Figure 9C:
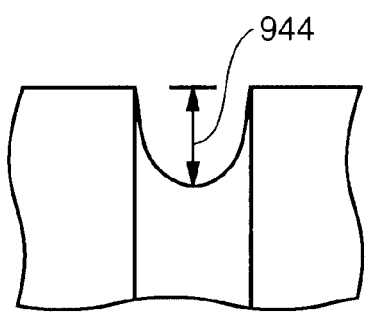
FIG. 9C is a view for explaining the arrangement of a groove of the guide roller shown in FIG. 9B.

The strand out of each discharge nozzle was supplied to a pelletizer through a cooling/drawing structure as shown in FIGS. 9A to 9C to obtain the resin composition A (pellets). The strand draw speed (Vs) was set to 35 m/min. Two guide rollers having a diameter of 40 mm, a groove depth of 7.5 mm, and a groove pitch of 9 mm were used. A guide roller 94A near the die in the cooling tank was rotatable, whereas the other guide roller 94B was fixed not to rotate. A rotational speed (Vr) of the guide rollers during strand drawing was obtained as (radius 20 mm−groove depth 7.5 mm)×2×Π×rotational speed per minute=6 m/min. Vr/Vs=0.17.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 2 mg by measurement.

Example 10

Resin extrusion was performed under the same conditions as in Example 9 except that the average linear velocity of the air stream in the circumferential direction of the discharge nozzle was 35 m/sec. The ratio of the increase in the diameter by the Barus effect (die swell ratio) D/φd was 1.17.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 1 mg by measurement.

Example 11

Resin extrusion was performed under the same conditions as in Example 9 except that the length of the discharge nozzle was 35 mm. The ratio of the increase in the diameter by the Barus effect (die swell ratio) D/φd was 1.17.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 3 mg by measurement.

Example 12

Resin extrusion was performed under the same conditions as in Example 9 except that the maximum sectional area of the manifold 120 was 470 mm² (nozzle opening ratio was 6%). The ratio of the increase in the diameter by the Barus effect (die swell ratio) D/φd was 1.17.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 2 mg by measurement.

Example 13

Resin extrusion was performed under the same conditions as in Example 9 except that a resin composition B was used, φD=3.24 mm (D/φd=1.08), and a rotational speed Vr of a guide roller 94A was 5 m/min (Vr/Vs=0.14). The ratio of the increase in the diameter by the Barus effect (die swell ratio) D/φd was 1.08.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition B with changed properties) was not detected. The die drool is supposed to have been dispersed and absorbed in the strand surface because it was yet to degrade. Three hours later, small die drool adhered to the periphery of the three discharge nozzles was collected. It proved to weigh only 3 mg by measurement.

Example 14

Resin extrusion was performed under the same conditions as in Example 9 except that a resin composition C was used, φD=3.27 mm (D/φd=1.09), and a rotational speed Vr of a guide roller 94A was 8 m/min (Vr/Vs=0.23). The ratio of the increase in the diameter by the Barus effect (die swell ratio) D/φd was 1.09.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition C with changed properties) was not detected. The die drool is supposed to have been dispersed and absorbed in the strand surface because it was yet to degrade. Three hours later, small die drool adhered to the periphery of the three discharge nozzles was collected. They proved to weigh only 1 mg by measurement.

Example 15

Extrusion was performed under the same conditions as in Example 9 except that a gas outlet 11 of a cover 10 had a circular shape with a diameter of 5.7 mm, dmin=0.5 mm, and dmax=0.75 mm (dmax/dmin=1.5). The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 4 mg by measurement.

Example 16

Extrusion was performed under the same conditions as in Example 15 except that a gas outlet 11 of a cover 10 had a circular shape with a diameter of 6.0 mm, dmin=0.5 mm, and dmax=0.9 mm (dmax/dmin=1.8). The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 5 mg by measurement.

Example 17

Extrusion was performed under the same conditions as in Example 9 except that the flow rate of air from each gas outlet was 4 L/min at room temperature, and φD=3.54 mm (D/φd=1.18). The average linear velocity of the air stream in the circumferential direction of the nozzle was 8 m/sec. The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 5 mg by measurement.

Example 18

Extrusion was performed under the same conditions as in Example 9 except that dmin=1.1 mm and dmax=1.21 mm without changing dmax/dmin=1.1. The ratio of the increase in the diameter by the Barus effect (die swell ratio) D/φd was 1.17.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 6 mg by measurement.

Example 19

A resin was extruded under the same conditions as in Example 9 except that a compact electrodynamic vibration test equipment (Wave Maker 01 available from ASAHI Seisakusho) serving as a vibration machine 30 shown in FIG. 7 was attached to the cap portion of a resin extrusion die to apply a vibration with a frequency of 20 Hz and an output of 50% in the vertical direction. The vibration amount and vibration velocity of the cap were measured by pushing a pocketable vibration meter VM-63A "RIOVIBRO" available from RION against the cap. The amplitude was 0.01 mm, and the vibration velocity was 1.0 mm/sec. The ratio of the increase in the diameter by the Barus effect (die swell ratio) D/φd was 1.17.

In continuous extrusion of three hours, die drool generation and contamination of the molded form with foreign substances (resin composition A with changed properties) were not detected.

Extrusion was continued for three additional hours, and evaluation for the six hours was done. Even after the elapse of six hours, contamination of the molded form (pellets, in this case) with foreign substances was not detected. Six hours later, small die drool adhered to the periphery of the three discharge nozzles was collected. It proved to weigh only 2 mg by measurement.

Example 20

Extrusion was performed under the same conditions as in Example 19 except that a gas outlet 11 of a cover 10 had a circular shape with a diameter of 5.7 mm, dmin=0.5 mm, and dmax=0.75 mm (dmax/dmin=1.5). The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 1 mg by measurement.

Example 21

Extrusion was performed under the same conditions as in Example 19 except that a gas outlet 11 of a cover 10 had a circular shape with a diameter of 6.0 mm, dmin=0.5 mm, and dmax=0.9 mm (dmax/dmin=1.8). The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 2 mg by measurement.

Example 22

A resin was extruded under the same conditions as in Example 19 except that a compact electrodynamic vibration test equipment (Wave Maker 01 available from ASAHI Seisakusho) was attached to apply a vibration with a frequency of 20 Hz and an output of 100% in the vertical direction. The vibration amount and vibration velocity of the cap were measured by pushing a pocketable vibration meter VM-63A "RIOVIBRO" available from RION against the cap. The amplitude was 0.018 mm, and the vibration velocity was 2.1 mm/sec. The ratio of the increase in the diameter by the Barus effect (die swell ratio) D/φd was 1.17.

In continuous extrusion of three hours, die drool generation and contamination of the molded form with foreign substances (resin composition A with changed properties) were not detected.

Extrusion was continued for three additional hours, and evaluation for the six hours was done. Even after the elapse of six hours, contamination of the molded form (pellets, in this case) with foreign substances was not detected. Six hours later, small die drool adhered to the periphery of the three discharge nozzles was collected. It proved to weigh only 1 mg by measurement.

Example 23

Resin extrusion was performed under the same conditions as in Example 20 except that the same vibration as in Example 22 was applied. The ratio of the increase in the diameter by the Barus effect (die swell ratio) D/φd was 1.18.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 1 mg by measurement.

Example 24

Resin extrusion was performed under the same conditions as in Example 21 except that the same vibration as in Example 22 was applied. The ratio of the increase in the diameter by the Barus effect (die swell ratio) D/φd was 1.18.

Extrusion was performed continuously for three hours. Small die drool was observed about one hour after the start of molding. However, the die drool that was still small pieces was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 1 mg by measurement.

Example 25

Resin extrusion was performed under the same conditions as in Example 9 except that the resin discharge amount per discharge nozzle was 33.4 kg/hr, a strand draw speed (Vs) was 70 m/min, and a rotational speed (Vr) of the guide rollers during strand drawing was 13 m/min (Vr/Vs=0.19). The ratio of the increase in the diameter by the Barus effect (die swell ratio) D/φd was 1.21.

Extrusion was performed continuously for three hours. Small die drool was observed about two hours after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 3 mg by measurement.

Example 26

A resin was extruded under the same conditions as in Example 19 except that a guide roller 94A was not rotatable (Vr=0 m/min, Vr/Vs=0). The ratio of the increase in the diameter by the Barus effect (die swell ratio) D/φd was 1.17.

In continuous extrusion of three hours, die drool generation and contamination of the molded form with foreign substances (resin composition A with changed properties) were not detected.

Extrusion was continued for three additional hours, and evaluation for the six hours was done. Even after the elapse of six hours, die drool generation and contamination of the molded form with foreign substances (resin composition A with changed properties) were not detected.

Example 27

A resin was extruded under the same conditions as in Example 26 except that a driving device was attached to a guide roller 94A to rotate it in the same direction as the traveling direction of the strand (Vr=35 m/min, Vr/Vs=1). The ratio of the increase in the diameter by the Barus effect (die swell ratio) D/φd was 1.17.

Extrusion was performed continuously for three hours. Small die drool was observed about one hour after the start of molding. However, the die drool that was still small piece was blown off and not deposited in a large amount. Contamination of the molded form (pellets, in this case) with one foreign substance (resin composition A with changed properties) was detected. Three hours later, small die drool adhered to the periphery of the three discharge nozzles was collected. It proved to weigh only 2 mg by measurement.

Example 28

A resin was extruded under the same conditions as in Example 9 except that 0.3 parts by weight a release agent (low molecular weight polyethylene HW100P available from Mitsui Petrochemical Industries) was added to 99.7 wt % a resin composition A. The ratio of the increase in the diameter by the Barus effect (die swell ratio) D/φd was 1.17.

In continuous extrusion of three hours, die drool generation and contamination of the molded form with foreign substances (resin composition A with changed properties) were not detected.

Extrusion was continued for three additional hours, and evaluation for the six hours was done. Even after the elapse of six hours, contamination of the molded form (pellets, in this case) with foreign substances was not detected. Six hours later, small die drool adhered to the periphery of the three discharge nozzles was collected. It proved to weigh only 3 mg by measurement.

Example 29

A resin composition (resin composition D: the shearing viscosity at a temperature of 280° C. and a shear rate of 100/sec was 180 Pa·sec) containing 30 wt % glass fiber (183H-13P available from Owens Corning) and 70 wt % polybutylene terephthalate (Novarex 5007 available from Mitsubishi Engineering-Plastics) was extruded while setting a rotational speed Vr of a guide roller 94A to 5 m/min (Vr/Vs=0.14) and the shear rate to 180 Pa·sec. The ratio of the increase in the diameter by the Barus effect (die swell ratio) D/φd was 1.04.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition D with changed properties) was not detected. The die drool is supposed to have been dispersed and absorbed in the strand surface because it was yet to degrade. Three hours later, small die drool adhered to the periphery of the three discharge nozzles was collected. It proved to weigh only 6 mg by measurement.

Example 30

A resin composition (resin composition E: the shearing viscosity at a temperature of 280° C. and a shear rate of 100/sec was 4,200 Pa·sec) containing 30 wt % glass fiber (FT737 available from Owens Corning) and 70 wt % polycarbonate (Iupilon E2000 available from Mitsubishi Engineering-Plastics) was extruded while setting a rotational speed Vr of a guide roller 94A to 12 m/min (Vr/Vs=0.34) and the shear rate to 4,200 Pa·sec. The ratio of the increase in the diameter by the Barus effect (die swell ratio) D/φd was 1.37.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition E with changed properties) was not detected. The die drool is supposed to have been dispersed and absorbed in the strand surface because it was yet to degrade. Three hours later, small die drool adhered to the periphery of the three discharge nozzles was collected. It proved to weigh only 13 mg by measurement.

Example 31

Extrusion was performed under the same conditions as in Example 9 except that the length of the discharge nozzle was 14 mm. The ratio of the increase in the diameter by the Barus effect (die swell ratio) D/φd was 1.22.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 7 mg by measurement.

Example 32

Extrusion was performed under the same conditions as in Example 9 except that the length of the discharge nozzle was 52 mm. The ratio of the increase in the diameter by the Barus effect (die swell ratio) D/φd was 1.11.

Extrusion was performed continuously for three hours. Small die drool was observed about one hour after the start of molding. However, the die drool that was still small piece was blown off and not deposited in a large amount. Contamination of the molded form (pellets, in this case) with one foreign substance (resin composition A with changed properties) was detected. Three hours later, small die drool adhered to the periphery of the three discharge nozzles was collected. It proved to weigh only 12 mg by measurement.

Example 33

Out of three discharge nozzles, those at two ends were closed by brass from inside of the die so as to allow one discharge nozzle at the center to discharge a resin. In this case, the nozzle opening ratio (S1/S2 (%)) was 1.06.

A strand draw speed Vs was 105 m/sec, and a rotational speed Vr of a guide roller 94A was 25 m/sec. The resin was extruded under the same remaining conditions as in Example 9. The ratio of the increase in the diameter by the Barus effect (die swell ratio) D/φd was 1.27.

Extrusion was performed continuously for three hours. Small die drool was observed about one hour after the start of molding. However, the die drool that was still small piece was blown off and not deposited in a large amount. Some of the die drool blown off appeared to have adhered to the strands, though contamination of the molded form (pellets, in this case) with foreign substances (resin composition A with changed properties) was not detected. The die drool is supposed to have been dispersed and absorbed in the strand surface because it was yet to degrade. Three hours later, small die drool adhered to the periphery of the three discharge nozzles was collected. It proved to weigh only 11 mg by measurement.

Comparative Example 4

Extrusion was performed as in Example 9 except that dmin=0.5 mm and dmax=0.5 mm (that is, dmax/dmin=1.0), and the width of the gap between a discharge nozzle 12 and a gas outlet 11 was uniform. The ratio of the increase in the diameter by the Barus effect (die swell ratio) D/φd was 1.17.

Die drools were observed within one hour after the start of continuous extrusion of three hours, and contamination of the molded form with 20 foreign substances (resin composition A with changed properties) was confirmed. Three hours later, die drools adhered to the tips of three discharge nozzles were collected. They proved to weigh 17 mg by measurement.

Comparative Example 5

Extrusion was performed as in Example 9 except that dmin=0.5 mm and dmax=1.25 mm (that is, dmax/dmin=2.5). The ratio of the increase in the diameter by the Barus effect (die swell ratio) D/φd was 1.17.

Die drool was observed several minutes after the start of continuous extrusion of three hours, and contamination of the molded form with 27 foreign substances (resin composition A with changed properties) was confirmed. Three hours later, die drool adhered to the tips of three discharge nozzles was collected. It proved to weigh 24 mg by measurement.

Tables 2 to 4 show the results of Examples 9 to 33 and Comparative Examples 4 and 5.

TABLE 2

| | | Cap | | | | | | | |
|---|---|---|---|---|---|---|---|---|---|
| | Material | dmax/dmin | dmin (mm) | Amplitude (mm) | Vibration velocity (mm/sec) | Resin discharge amount kg/(hr · port) | (φD − φd)/2 (mm) | φd (mm) | D/φd |
| Example 9 | A | 1.1 | 0.5 | 0.008 | 0.42 | 16.7 | 0.1 | 3 | 1.17 |
| Example 10 | A | 1.1 | 0.5 | 0.008 | 0.42 | 16.7 | 0.1 | 3 | 1.17 |

TABLE 2-continued

| | | | | | Cap | | | | |
| | Material | dmax/dmin | dmin (mm) | Amplitude (mm) | Vibration velocity (mm/sec) | Resin discharge amount kg/(hr · port) | (φD − φd)/2 (mm) | φd (mm) | D/φd |
| --- | --- | --- | --- | --- | --- | --- | --- | --- | --- |
| Example 11 | A | 1.1 | 0.5 | 0.008 | 0.42 | 16.7 | 0.1 | 3 | 1.17 |
| Example 12 | A | 1.1 | 0.5 | 0.008 | 0.42 | 16.7 | 0.1 | 3 | 1.17 |
| Example 13 | B | 1.1 | 0.5 | 0.008 | 0.42 | 16.7 | 0.1 | 3 | 1.08 |
| Example 14 | C | 1.1 | 0.5 | 0.008 | 0.42 | 16.7 | 0.1 | 3 | 1.09 |
| Example 15 | A | 1.5 | 0.5 | 0.008 | 0.42 | 16.7 | 0.1 | 3 | 1.18 |
| Example 16 | A | 1.8 | 0.5 | 0.008 | 0.42 | 16.7 | 0.1 | 3 | 1.18 |
| Example 17 | A | 1.1 | 0.5 | 0.008 | 0.42 | 16.7 | 0.1 | 3 | 1.18 |
| Example 18 | A | 1.1 | 1.1 | 0.008 | 0.42 | 16.7 | 0.1 | 3 | 1.17 |
| Example 19 | A | 1.1 | 0.5 | 0.01 | 1.0 | 16.7 | 0.1 | 3 | 1.17 |
| Example 20 | A | 1.5 | 0.5 | 0.01 | 1.0 | 16.7 | 0.1 | 3 | 1.18 |
| Example 21 | A | 1.8 | 0.5 | 0.01 | 1.0 | 16.7 | 0.1 | 3 | 1.18 |
| Example 22 | A | 1.1 | 0.5 | 0.018 | 2.1 | 16.7 | 0.1 | 3 | 1.17 |
| Example 23 | A | 1.5 | 0.5 | 0.018 | 2.1 | 16.7 | 0.1 | 3 | 1.18 |
| Example 24 | A | 1.8 | 0.5 | 0.018 | 2.1 | 16.7 | 0.1 | 3 | 1.18 |
| Example 25 | A | 1.1 | 0.5 | 0.008 | 0.42 | 33.4 | 0.1 | 3 | 1.21 |
| Example 26 | A | 1.1 | 0.5 | 0.01 | 1.0 | 16.7 | 0.1 | 3 | 1.17 |
| Example 27 | A | 1.1 | 0.5 | 0.01 | 1.0 | 16.7 | 0.1 | 3 | 1.17 |
| Example 28 | A | 1.1 | 0.5 | 0.008 | 0.42 | 16.7 | 0.1 | 3 | 1.17 |
| Example 29 | D | 1.1 | 0.5 | 0.008 | 0.42 | 16.7 | 0.1 | 3 | 1.04 |
| Example 30 | E | 1.1 | 0.5 | 0.008 | 0.42 | 16.7 | 0.1 | 3 | 1.37 |
| Example 31 | A | 1.1 | 0.5 | 0.008 | 0.42 | 16.7 | 0.1 | 3 | 1.22 |
| Example 32 | A | 1.1 | 0.5 | 0.008 | 0.42 | 16.7 | 0.1 | 3 | 1.11 |
| Example 33 | A | 1.1 | 0.5 | 0.008 | 0.42 | 50 | 0.1 | 3 | 1.27 |
| Comparative Example 4 | A | 1.0 | 0.5 | 0.008 | 0.42 | 16.7 | 0.1 | 3 | 1.17 |
| Comparative Example 5 | A | 2.5 | 0.5 | 0.008 | 0.42 | 16.7 | 0.1 | 3 | 1.17 |

TABLE 3

| | Shear rate (Pa · sec) | Gas flow rate L/(min · port) | Average linear velocity of air stream in circumferential direction of nozzle (m/sec) | Nozzle length (mm) | Nozzle opening ratio (S1/S2) (%) | Vs (m/min) | Vr (m/min) | Vr/Vs (%) |
| --- | --- | --- | --- | --- | --- | --- | --- | --- |
| Example 9 | 1,300 | 10 | 20 | 25 | 3.2 | 35 | 6 | 0.17 |
| Example 10 | 1,300 | 17.5 | 35 | 25 | 3.2 | 35 | 6 | 0.17 |
| Example 11 | 1,300 | 10 | 20 | 35 | 3.2 | 35 | 6 | 0.17 |
| Example 12 | 1,300 | 10 | 20 | 25 | 6 | 35 | 6 | 0.17 |
| Example 13 | 340 | 10 | 20 | 25 | 3.2 | 35 | 5 | 0.14 |
| Example 14 | 370 | 10 | 20 | 25 | 3.2 | 35 | 8 | 0.23 |
| Example 15 | 1,300 | 10 | 20 | 25 | 3.2 | 35 | 6 | 0.17 |
| Example 16 | 1,300 | 10 | 20 | 25 | 3.2 | 35 | 6 | 0.17 |
| Example 17 | 1,300 | 4 | 8 | 25 | 3.2 | 35 | 6 | 0.17 |
| Example 18 | 1,300 | 10 | 20 | 25 | 3.2 | 35 | 6 | 0.17 |
| Example 19 | 1,300 | 10 | 20 | 25 | 3.2 | 35 | 6 | 0.17 |
| Example 20 | 1,300 | 10 | 20 | 25 | 3.2 | 35 | 6 | 0.17 |
| Example 21 | 1,300 | 10 | 20 | 25 | 3.2 | 35 | 6 | 0.17 |
| Example 22 | 1,300 | 10 | 20 | 25 | 3.2 | 35 | 6 | 0.17 |
| Example 23 | 1,300 | 10 | 20 | 25 | 3.2 | 35 | 6 | 0.17 |
| Example 24 | 1,300 | 10 | 20 | 25 | 3.2 | 35 | 6 | 0.17 |
| Example 25 | 1,300 | 10 | 20 | 25 | 3.2 | 70 | 13 | 0.19 |
| Example 26 | 1,300 | 10 | 20 | 25 | 3.2 | 35 | 0 | 0.00 |
| Example 27 | 1,300 | 10 | 20 | 25 | 3.2 | 35 | 35 | 1.00 |
| Example 28 | 1,300 | 10 | 20 | 25 | 3.2 | 35 | 6 | 0.17 |
| Example 29 | 180 | 10 | 20 | 25 | 3.2 | 35 | 5 | 0.14 |
| Example 30 | 4,200 | 10 | 20 | 25 | 3.2 | 35 | 12 | 0.34 |
| Example 31 | 1,300 | 10 | 20 | 14 | 3.2 | 35 | 6 | 0.17 |
| Example 32 | 1,300 | 10 | 20 | 52 | 3.2 | 35 | 6 | 0.17 |
| Example 33 | 1,300 | 10 | 20 | 25 | 1.06 | 105 | 25 | 0.24 |
| Comparative Example 4 | 1,300 | 10 | 20 | 25 | 3.2 | 35 | 6 | 0.17 |
| Comparative Example 5 | 1,300 | 10 | 20 | 25 | 3.2 | 35 | 6 | 0.17 |

TABLE 4

|  | Evaluation for three hours | | | Evaluation for six hours | | |
| --- | --- | --- | --- | --- | --- | --- |
|  | Die drool amount (mg) | Number of pellets with die drool (pieces) | Result | Die drool amount (mg) | Number of pellets with die drool (pieces) | Result |
| Example 9 | 2 | 0 | AA | — | — | — |
| Example 10 | 1 | 0 | AA | — | — | — |
| Example 11 | 3 | 0 | AA | — | — | — |
| Example 12 | 2 | 0 | AA | — | — | — |
| Example 13 | 3 | 0 | AA | — | — | — |
| Example 14 | 1 | 0 | AA | — | — | — |
| Example 15 | 4 | 0 | A | — | — | — |
| Example 16 | 5 | 0 | A | — | — | — |
| Example 17 | 5 | 0 | A | — | — | — |
| Example 18 | 6 | 0 | A | — | — | — |
| Example 19 | 0 | 0 | AAA | 2 | 0 | AA |
| Example 20 | 1 | 0 | AA | — | — | — |
| Example 21 | 2 | 0 | AA | — | — | — |
| Example 22 | 0 | 0 | AAA | 1 | 0 | AA |
| Example 23 | 1 | 0 | AA | — | — | — |
| Example 24 | 1 | 0 | AA | — | — | — |
| Example 25 | 3 | 0 | AA | — | — | — |
| Example 26 | 0 | 0 | AAA | 0 | 0 | AAA |
| Example 27 | 2 | 1 | BBB | — | — | — |
| Example 28 | 0 | 0 | AAA | 1 | 0 | AA |
| Example 29 | 6 | 0 | A | — | — | — |
| Example 30 | 13 | 0 | A | — | — | — |
| Example 31 | 7 | 0 | A | — | — | — |
| Example 32 | 12 | 1 | BBB | — | — | — |
| Example 33 | 11 | 0 | A | — | — | — |
| Comparative Example 4 | 17 | 20 | BB | — | — | — |
| Comparative Example 5 | 24 | 27 | B | — | — | — |

Evaluation for Three Hours

AAA Die drool generation and contamination of the molded form (pellets) with foreign substances were not confirmed even after the elapse of three hours.

AA Small amount of die drool was confirmed two hours later, but contamination of the molded form (pellets) with foreign substances was not confirmed.

A Small amount of die drool was confirmed one hour later, but contamination of the molded form (pellets) with foreign substances was not confirmed.

BBB Small die drool was confirmed one hour later, and contamination of the molded form (pellets) with foreign substances was also confirmed.

BB Die drool was confirmed within one hour, and contamination of the molded form (pellets) with foreign substances was also confirmed.

B Die drool was confirmed several minutes later, and contamination of the molded form (pellets) with foreign substances was also confirmed.

Only when the result was AAA in the evaluation for three hours, evaluation for six hours was performed.

AAA Die drool generation and contamination of the molded form (pellets) with foreign substances were not confirmed even after the elapse of six hours.

AA Small amount of die drool was confirmed within six hours after the elapse of three hours, but contamination of the molded form (pellets) with foreign substances was not confirmed.

A Small amount of die drool was confirmed within six hours after the elapse of three hours, and contamination of the molded form (pellets) with foreign substances was also confirmed.

As described above, according to the present invention, in the resin extrusion die that suppresses die drool deposition at the discharge nozzle tip and die drool adhesion to the extruded resin by causing a gas to flow from the outer periphery of the discharge nozzle tip, the gas flowing out of the gap around the discharge nozzle tip is changed to a turbulent flow so that at least one of the temporal distribution and the spatial distribution of the flow velocity or the flow rate becomes nonuniform. This allows more effective suppression of generation and deposition of die drool, and even if die drool is generated, blow it off at an early stage when it is still small. It is therefore possible to suppress contamination of the extruded resin molded form with the foreign substances and continuously manufacture high-quality resin products.

The preferred embodiments of the present invention have been described above with reference to the accompanying drawings. However, the present invention is not limited to the above embodiments, and various changes and modifications can be made within the technical scope grasped from the description of claims.

The invention claimed is:

1. A resin extrusion die configured to extrude a molten resin comprising a thermoplastic resin composition, supplied from an extrusion machine into a strand, the resin extrusion die comprising:

a cap comprising a discharge nozzle through which the molten resin is extruded;

a cover comprising a gas outlet that forms a gap around a tip of the discharge nozzle, wherein the cover covers at least part of the cap, forming a space between the cap and the gas outlet;

a gas supply port configured to supply a gas to the space;

an adjusting mechanism configured to adjust a relative positional relationship between the cover and the cap; and a vibration unit that vibrates the cap, wherein both the gas outlet and an orifice of the discharge nozzle are circular, and a center of the gas outlet is arranged at a position shifted from a center of the orifice, wherein the gas outlet forms, around the tip of the discharge nozzle, the gap whose ratio of maximum width to minimum width, dmax/dmin, is in a range from 1.05 to 2.0, thereby changing the gas flowing out of the gap to a turbulent flow, and wherein the vibration unit is configured to dynamically change the gap around the tip of the discharge nozzle by vibrating the cap within a range of amplitude: 0.005 to 0.2 mm, and vibration velocity: 0.3 to 5 mm/sec.

2. The resin extrusion die according to claim 1, wherein the discharge nozzle has an inner diameter $\phi d$ such that 2 mm≤$\phi d$≤7 mm.

3. The resin extrusion die according to claim 1, wherein gap has a size of 0.1 to 1 mm.

4. The resin extrusion die according to claim 1, wherein the discharge nozzle comprises a plurality of discharge nozzles, the die further comprises a manifold configured to make a pressure of the molten resin supplied from the extrusion machine uniform, and supply the molten resin to the plurality of discharge nozzles, and a nozzle opening ratio S1/S2 of a total area of minimum sectional areas of the plurality of discharge nozzles in a direction perpendicular to an extrusion direction of the molten resin to a maximum sectional area of the manifold in the direction perpendicular to the extrusion direction satisfies 10%≥S1/S2≥1.2%.

5. The resin extrusion die according to claim 1, wherein a length L of the discharge nozzle satisfies 50 mm≥L≥15 mm.

6. The resin extrusion die according to claim 1, wherein dmax/dmin is in a range from 1.05 to 1.5.

7. A method of extruding a molten thermoplastic resin composition into a strand, the method comprising extruding the molten thermoplastic resin composition from the resin extrusion die of claim 1 while supplying the gas from the gas supply port of the die co ac to change the gas flowing out of the gap to a turbulent flow and blow the gas to a vicinity of the tip of the discharge nozzle, thereby suppressing part of the molten resin extruded from the die from being deposited on the tip of the discharge nozzle.

8. The method according to claim 7, wherein a wall thickness Lt of the tip of the discharge nozzle satisfies 0°Lt≤2 mm, and the molten resin is extruded in a discharge amount of 14 kg/hr to 40 kg/hr per discharge nozzle while blowing the gas to the vicinity of the tip of the discharge nozzle so as to expand the molten resin by a Barus effect near the tip of the discharge nozzle and change a flow of the gas at an expanded portion, thereby suppressing part of the extruded molten resin from being deposited on the tip of the discharge nozzle.

9. The method according to claim 8, wherein an expansion coefficient of the molten resin by the Barus effect satisfies 1.35≥D/$\phi d$≥1.05, wherein $\phi d$ is an inner diameter of the discharge nozzle, and D is a diameter of a resin strand after the molten resin is extruded from the discharge nozzle into a strand and expanded.

10. The method according to claim 7, wherein the thermoplastic resin composition has a shearing viscosity of 50 Pa·sec to 5,000 Pa·sec at a temperature of 280° C. and a shear rate of 100/sec.

11. The method according to claim 7, wherein a linear velocity of the gas near the tip of the discharge nozzle is 4 to 100 m/sec.

12. The method according to claim 7, wherein the discharge nozzle has an inner diameter $\phi d$ such that 2 mm≤$\phi d$≤7 mm.

13. The method according to claim 7, wherein the gap has a size of 0.1 to 1 mm.

14. The method according to claim 7, wherein:

the resin extrusion die comprises:

a plurality of discharge nozzles; and a manifold configured to make a pressure of the molten resin supplied from the extrusion machine uniform, and supply the molten resin to the plurality of discharge nozzles, and a nozzle opening ratio S1/S2 of a total area of minimum sectional areas of the plurality of discharge nozzles in a direction perpendicular to an extrusion direction of the molten resin to a maximum sectional area of the manifold in the direction perpendicular to the extrusion direction satisfies 10%≥S1/S2≥1.2%.

15. The method according to claim 7, wherein a length L of the discharge nozzle satisfies 50 mm≥L≥15 mm.

16. The method according to claim 7, wherein:

the extruded resin strand is drawn at a draw speed Vs while in contact with a guide roller disposed in a conveyance path, a moving speed of an outer peripheral surface of the guide roller in contact with the resin strand is Vr, and the draw speed, the moving speed, and a direction of rotation of the guide roller are determined such that 0.7≥Vr/Vs≥−0.2.

17. The method according to claim 7, wherein the molten resin is extruded while vibrating the resin extrusion die within a range of amplitude: 0.005 to 0.2 mm, and vibration velocity: 0.3 to 5 mm/sec.

\* \* \* \* \*